US012580767B2

(12) United States Patent
Glynn et al.

(10) Patent No.: US 12,580,767 B2
(45) Date of Patent: Mar. 17, 2026

(54) TRANSMISSION OF SECURE AND AUTHENTICATED DATA OVER A NETWORK

(71) Applicant: Capital One Services, LLC, McLean, VA (US)

(72) Inventors: Anthony Glynn, Fairfax, VA (US); Soumendra Bhattacharya, Union City, CA (US); Robert Mantoni, Reston, VA (US)

(73) Assignee: Capital One Services, LLC., McLean, VA (US)

( * ) Notice: Subject to any disclaimer, the term of this patent is extended or adjusted under 35 U.S.C. 154(b) by 62 days.

(21) Appl. No.: 18/498,420

(22) Filed: Oct. 31, 2023

(65) Prior Publication Data

US 2025/0141687 A1     May 1, 2025

(51) Int. Cl.
| | |
|---|---|
| *H04L 9/32* | (2006.01) |
| *H04L 9/08* | (2006.01) |
| *H04L 9/30* | (2006.01) |

(52) U.S. Cl.
CPC .......... *H04L 9/3234* (2013.01); *H04L 9/0841* (2013.01); *H04L 9/085* (2013.01); *H04L 9/3066* (2013.01); *H04L 9/3213* (2013.01)

(58) Field of Classification Search
CPC ..... H04L 9/3234; H04L 9/0841; H04L 9/085; H04L 9/3066; H04L 9/3213;
(Continued)

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.
(Continued)

*Primary Examiner* — Izunna Okeke
(74) *Attorney, Agent, or Firm* — KDW FIRM PLLC

(57) ABSTRACT

A method, a system, and a computer program product for transmission of information over a network. A validity token is generated based on a received contactless card identifier associated with a contactless card. The validity token is generated upon validating the contactless card using the contactless card identifier, and transmitted to a first computing device. A second computing device is identified based on an information request received from the first computing device. The information request includes a first public key associated with the first computing device and the validity token. An encrypted response to the request and a second public key associated with the second computing device are sent to the first computing device. The second computing device generates the encrypted response and encrypts it using a shared key generated using the first public key. The first computing device decrypts the response upon generation of the shared key using the second public key.

19 Claims, 18 Drawing Sheets

(58) Field of Classification Search

CPC ............. G06Q 20/027; G06Q 20/3278; G06Q 20/352; G06Q 20/353; G06Q 20/3823; G06Q 20/385; G06Q 20/38215

See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,590,038 A | 12/1996 | Pitroda |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,572,015 B1 | 6/2003 | Norton |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,252,242 B2 | 8/2007 | Ho |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,527,208 B2 | 5/2009 | Hammad |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,276,814 B1 | 10/2012 | Davis |
| 8,285,329 B1 | 10/2012 | Zhu |

(56)　　　　　References Cited

U.S. PATENT DOCUMENTS

| | | | |
|---|---|---|---|
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,346,670 | B2 | 1/2013 | Hasson |
| 8,365,988 | B1 | 2/2013 | Medina, III et al. |
| 8,369,960 | B2 | 2/2013 | Tran et al. |
| 8,371,501 | B1 | 2/2013 | Hopkins |
| 8,381,307 | B2 | 2/2013 | Cimino |
| 8,391,719 | B2 | 3/2013 | Alameh et al. |
| 8,417,231 | B2 | 4/2013 | Sanding et al. |
| 8,439,271 | B2 | 5/2013 | Smets et al. |
| 8,475,367 | B1 | 7/2013 | Yuen et al. |
| 8,489,112 | B2 | 7/2013 | Roeding et al. |
| 8,511,542 | B2 | 8/2013 | Pan |
| 8,511,547 | B2 | 8/2013 | Rans |
| 8,519,822 | B2 | 8/2013 | Riegebauer |
| 8,559,872 | B2 | 10/2013 | Butler |
| 8,566,916 | B1 | 10/2013 | Bailey et al. |
| 8,567,670 | B2 | 10/2013 | Stanfield et al. |
| 8,572,386 | B2 | 10/2013 | Takekawa et al. |
| 8,577,810 | B1 | 11/2013 | Dalit et al. |
| 8,583,454 | B2 | 11/2013 | Beraja et al. |
| 8,589,335 | B2 | 11/2013 | Smith et al. |
| 8,594,730 | B2 | 11/2013 | Bona et al. |
| 8,615,468 | B2 | 12/2013 | Varadarajan |
| 8,620,218 | B2 | 12/2013 | Awad |
| 8,667,285 | B2 | 3/2014 | Coulier et al. |
| 8,723,941 | B1 | 5/2014 | Shirbabadi et al. |
| 8,726,405 | B1 | 5/2014 | Bailey et al. |
| 8,740,073 | B2 | 6/2014 | Vijayshankar et al. |
| 8,750,514 | B2 | 6/2014 | Gallo et al. |
| 8,752,189 | B2 | 6/2014 | de Jong |
| 8,794,509 | B2 | 8/2014 | Bishop et al. |
| 8,799,668 | B2 | 8/2014 | Cheng |
| 8,806,592 | B2 | 8/2014 | Ganesan |
| 8,807,440 | B1 | 8/2014 | von Behren et al. |
| 8,811,892 | B2 | 8/2014 | Khan et al. |
| 8,814,039 | B2 | 8/2014 | Bishop et al. |
| 8,814,052 | B2 | 8/2014 | Bona et al. |
| 8,818,867 | B2 | 8/2014 | Baldwin et al. |
| 8,850,538 | B1 | 9/2014 | Vernon et al. |
| 8,861,733 | B2 | 10/2014 | Benteo et al. |
| 8,870,081 | B2 | 10/2014 | Olson |
| 8,880,027 | B1 | 11/2014 | Darringer |
| 8,888,002 | B2 | 11/2014 | Marshall Chesney et al. |
| 8,898,088 | B2 | 11/2014 | Springer et al. |
| 8,909,557 | B2 * | 12/2014 | Collinge ................ G06Q 20/04 |
| | | | 705/64 |
| 8,934,837 | B2 | 1/2015 | Zhu et al. |
| 8,977,569 | B2 | 3/2015 | Rao |
| 8,994,498 | B2 | 3/2015 | Agrafioti et al. |
| 9,004,365 | B2 | 4/2015 | Bona et al. |
| 9,038,893 | B2 | 5/2015 | Kirkham |
| 9,038,894 | B2 | 5/2015 | Khalid |
| 9,042,814 | B2 | 5/2015 | Royston et al. |
| 9,047,531 | B2 | 6/2015 | Showering et al. |
| 9,069,976 | B2 | 6/2015 | Toole et al. |
| 9,081,948 | B2 | 7/2015 | Magne |
| 9,104,853 | B2 | 8/2015 | Venkataramani et al. |
| 9,118,663 | B1 | 8/2015 | Bailey et al. |
| 9,122,964 | B2 | 9/2015 | Krawczewicz |
| 9,129,199 | B2 | 9/2015 | Spodak |
| 9,129,280 | B2 | 9/2015 | Bona et al. |
| 9,152,832 | B2 | 10/2015 | Royston et al. |
| 9,183,490 | B2 | 11/2015 | Moreton |
| 9,203,800 | B2 | 12/2015 | Izu et al. |
| 9,209,867 | B2 | 12/2015 | Royston |
| 9,251,330 | B2 | 2/2016 | Boivie et al. |
| 9,251,518 | B2 | 2/2016 | Levin et al. |
| 9,258,715 | B2 | 2/2016 | Borghei |
| 9,270,337 | B2 | 2/2016 | Zhu et al. |
| 9,275,325 | B2 | 3/2016 | Newcombe |
| 9,286,606 | B2 | 3/2016 | Diamond |
| 9,306,626 | B2 | 4/2016 | Hall et al. |
| 9,306,753 | B1 | 4/2016 | Vandervort et al. |
| 9,306,942 | B1 | 4/2016 | Bailey et al. |
| 9,324,066 | B2 | 4/2016 | Archer et al. |
| 9,324,067 | B2 | 4/2016 | Van Os et al. |
| 9,332,587 | B2 | 5/2016 | Salahshoor |
| 9,338,622 | B2 | 5/2016 | Bjontegard |
| 9,373,141 | B1 | 6/2016 | Shakkarwar |
| 9,379,841 | B2 | 6/2016 | Fine et al. |
| 9,413,430 | B2 | 8/2016 | Royston et al. |
| 9,413,768 | B1 | 8/2016 | Gregg et al. |
| 9,420,496 | B1 | 8/2016 | Indurkar |
| 9,426,132 | B1 | 8/2016 | Alikhani |
| 9,432,339 | B1 | 8/2016 | Bowness |
| 9,455,968 | B1 | 9/2016 | Machani et al. |
| 9,473,509 | B2 | 10/2016 | Arsanjani et al. |
| 9,491,626 | B2 | 11/2016 | Sharma et al. |
| 9,501,776 | B2 | 11/2016 | Martin |
| 9,553,637 | B2 | 1/2017 | Yang et al. |
| 9,619,952 | B1 | 4/2017 | Zhao et al. |
| 9,635,000 | B1 | 4/2017 | Muftic |
| 9,665,858 | B1 | 5/2017 | Kumar |
| 9,674,705 | B2 | 6/2017 | Rose et al. |
| 9,679,286 | B2 | 6/2017 | Colnot et al. |
| 9,680,942 | B2 | 6/2017 | Dimmick |
| 9,710,744 | B2 | 7/2017 | Wurmfeld |
| 9,710,804 | B2 | 7/2017 | Zhou et al. |
| 9,740,342 | B2 | 8/2017 | Paulsen et al. |
| 9,740,988 | B1 | 8/2017 | Levin et al. |
| 9,763,097 | B2 | 9/2017 | Robinson et al. |
| 9,767,329 | B2 | 9/2017 | Forster |
| 9,769,662 | B1 | 9/2017 | Queru |
| 9,773,151 | B2 | 9/2017 | Mil'shtein et al. |
| 9,780,953 | B2 | 10/2017 | Gaddam et al. |
| 9,891,823 | B2 | 2/2018 | Feng et al. |
| 9,940,571 | B1 | 4/2018 | Herrington |
| 9,949,065 | B1 | 4/2018 | Zarakas |
| 9,953,323 | B2 | 4/2018 | Candelore et al. |
| 9,961,194 | B1 | 5/2018 | Wiechman et al. |
| 9,965,632 | B2 | 5/2018 | Zarakas |
| 9,965,756 | B2 | 5/2018 | Davis et al. |
| 9,965,911 | B2 | 5/2018 | Wishne |
| 9,977,890 | B2 | 5/2018 | Alberti |
| 9,978,056 | B2 | 5/2018 | Seo |
| 9,978,058 | B2 | 5/2018 | Wurmfeld et al. |
| 9,990,795 | B2 | 6/2018 | Wurmfeld |
| 10,007,873 | B2 | 6/2018 | Heo |
| 10,013,693 | B2 | 7/2018 | Wyatt |
| 10,043,164 | B2 | 8/2018 | Dogin et al. |
| 10,075,437 | B1 | 9/2018 | Costigan et al. |
| 10,121,130 | B2 | 11/2018 | Pinski |
| 10,129,648 | B1 | 11/2018 | Hernandez et al. |
| 10,133,979 | B1 | 11/2018 | Eidam et al. |
| 10,210,505 | B2 | 2/2019 | Zarakas |
| 10,217,105 | B1 | 2/2019 | Sangi et al. |
| 10,242,368 | B1 | 3/2019 | Poole |
| 10,296,910 | B1 | 5/2019 | Templeton |
| 10,332,102 | B2 | 6/2019 | Zarakas |
| 10,360,557 | B2 | 7/2019 | Locke |
| 10,380,471 | B2 | 8/2019 | Locke |
| 10,395,244 | B1 | 8/2019 | Mossler |
| 10,453,054 | B2 | 10/2019 | Zarakas |
| 10,474,941 | B2 | 11/2019 | Wurmfeld |
| 10,475,027 | B2 | 11/2019 | Guise |
| 10,482,453 | B2 | 11/2019 | Zarakas |
| 10,482,457 | B2 | 11/2019 | Poole |
| 10,489,774 | B2 | 11/2019 | Zarakas |
| 10,489,781 | B1 | 11/2019 | Osborn |
| 10,510,070 | B2 | 12/2019 | Wurmfeld |
| 10,515,361 | B2 | 12/2019 | Zarakas |
| 10,535,068 | B2 | 1/2020 | Locke |
| 10,546,444 | B2 | 1/2020 | Osborn |
| 10,581,611 | B1 | 3/2020 | Osborn |
| 10,664,830 | B1 | 5/2020 | Rule |
| 10,685,349 | B2 | 6/2020 | Brickell |
| 10,797,882 | B2 | 10/2020 | Rule |
| 10,880,741 | B2 | 12/2020 | Zarakas |
| 10,909,525 | B1 | 2/2021 | Dhodapkar |
| 10,970,691 | B2 | 4/2021 | Koeppel |
| 10,984,416 | B2 | 4/2021 | Ilincic |

(56) References Cited

U.S. PATENT DOCUMENTS

| | | |
|---|---|---|
| 11,037,136 B2 | 6/2021 | Rule |
| 11,062,098 B1 | 7/2021 | Bergeron |
| 11,120,453 B2 | 9/2021 | Rule |
| 11,138,593 B1 | 10/2021 | Ho |
| 11,138,605 B2 | 10/2021 | Aabye |
| 11,176,540 B2 | 11/2021 | Gupta |
| 11,188,908 B2 | 11/2021 | Locke |
| 11,216,806 B2 | 1/2022 | Mossler |
| 11,297,958 B2 | 4/2022 | Vukich |
| 11,334,872 B2 | 5/2022 | Phillips |
| 11,361,173 B2 | 6/2022 | Edwards |
| 11,392,933 B2 | 7/2022 | Mossler |
| 11,392,935 B2 | 7/2022 | Suresh |
| 11,416,844 B1 | 8/2022 | Osterkamp |
| 11,423,392 B1 | 8/2022 | Ho |
| 11,443,292 B2 | 9/2022 | Sherif |
| 11,444,770 B2 | 9/2022 | Wieker |
| 11,461,764 B2 | 10/2022 | Rule |
| 11,481,764 B2 | 10/2022 | Shakkarwar |
| 11,521,213 B2 | 12/2022 | Rule |
| 11,551,200 B1 | 1/2023 | Cook |
| 11,556,918 B2 | 1/2023 | Mestre |
| 11,615,395 B2 | 3/2023 | McHugh |
| 11,777,933 B2 | 10/2023 | Moreton |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2003/0220876 A1 | 11/2003 | Burger et al. |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0228997 A1 | 10/2005 | Bicker |
| 2005/0247797 A1 | 11/2005 | Ramachandran |
| 2005/0269402 A1 | 12/2005 | Spitzer et al. |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0276765 A1 | 11/2007 | Hazel et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0082452 A1 | 4/2008 | Wankmueller et al. |
| 2008/0086767 A1 | 4/2008 | Kulkarni et al. |
| 2008/0099552 A1 | 5/2008 | Grillion |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0155801 A1 | 6/2011 | Rowberry |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |

(56)     References Cited

U.S. PATENT DOCUMENTS

| | | |
|---|---|---|
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143703 A1 | 6/2012 | Wall |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0030997 A1 | 1/2013 | Spodak et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0146657 A1 | 6/2013 | Graef et al. |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0211937 A1 | 8/2013 | Elbirt |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0311363 A1 | 11/2013 | Ramaci |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365377 A1 | 12/2014 | Salama et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0073983 A1 | 3/2015 | Bartenstein et al. |
| 2015/0088757 A1 | 3/2015 | Zhou et al. |
| 2015/0089586 A1 | 3/2015 | Ballesteros |
| 2015/0113271 A1 | 4/2015 | Jooste et al. |
| 2015/0134452 A1 | 5/2015 | Williams |
| 2015/0134513 A1 | 5/2015 | Olson et al. |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0199673 A1 | 7/2015 | Savolainen |
| 2015/0199863 A1 | 7/2015 | Scoggins et al. |
| 2015/0205379 A1 | 7/2015 | Mag et al. |
| 2015/0254637 A1 | 9/2015 | Yang |
| 2015/0302409 A1 | 10/2015 | Malek et al. |
| 2015/0317295 A1 | 11/2015 | Sherry et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0078430 A1 | 3/2016 | Douglas |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0189143 A1 | 6/2016 | Koeppel |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |

(56)     References Cited

U.S. PATENT DOCUMENTS

| | | |
|---|---|---|
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0039987 A1 | 2/2018 | Molino |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0172055 A1 | 6/2019 | Hale |
| 2019/0238517 A1 | 8/2019 | D'Agostino et al. |
| 2019/0303945 A1 | 10/2019 | Mitra |
| 2020/0106618 A1* | 4/2020 | Osborn ..................... H04L 9/14 |
| 2021/0004806 A1 | 1/2021 | Noe |
| 2021/0272098 A1 | 9/2021 | Delsuc et al. |
| 2021/0304189 A1 | 9/2021 | Gupta |
| 2021/0383360 A1 | 12/2021 | Sinha |
| 2021/0406869 A1 | 12/2021 | Pathrabe |
| 2022/0114581 A1 | 4/2022 | Upadhye |
| 2022/0284416 A1 | 9/2022 | Rule |
| 2022/0309509 A1 | 9/2022 | Akgun |
| 2022/0335412 A1 | 10/2022 | Rule |
| 2022/0366410 A1 | 11/2022 | Rule |
| 2022/0398566 A1 | 12/2022 | Rule |
| 2022/0414648 A1 | 12/2022 | Rule |
| 2023/0054157 A1 | 2/2023 | Mao |
| 2023/0065163 A1 | 3/2023 | Vargas |
| 2023/0083785 A1 | 3/2023 | Maiman |
| 2023/0153560 A1 | 5/2023 | Rule et al. |
| 2023/0169505 A1 | 6/2023 | Rule |
| 2023/0354020 A1 | 11/2023 | Rule |
| 2023/0359839 A1 | 11/2023 | Lovgren |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| KR | 20150140132 A | 12/2015 |
| WO | 199910824 A1 | 3/1999 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017047855 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |
| WO | 2019022585 A1 | 1/2019 |
| WO | 2021051884 A1 | 3/2021 |
| WO | 2021133492 A1 | 7/2021 |
| WO | 2022108959 A1 | 5/2022 |
| WO | 2022187350 A1 | 9/2022 |
| WO | 2023017943 A1 | 2/2023 |
| WO | 2023064063 A1 | 4/2023 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

(56)     References Cited

OTHER PUBLICATIONS

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon. com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8): 173-181 (2013).

Author unknown, "EMV Card Personalization Specification", EMVCo., LLC., specification version 1.0, (2003) 81 pages.

Ullmann et al., "On-Card User Authentication for Contactless Smart Cards based on Gesture Recognition", paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

Smart Card Alliance, "Co-Branded Multi-Application Contactless Cards for Transit and Financial Payment," A Smart Card Alliance Transportation Council White Paper (40 pages), Mar. 2008.

Emvco: "EMV Card Personalisation Specification", Aug. 1, 2021, pp. 1-114, Retrieved from the Internet: URL: https://www.emvco.com/specification/?post_id=12467.

The International Search Report and Written Opinion mailed Jan. 3, 2025 for corresponding PCT/US2024/053355 (16 pages).

Saush, "Getting information from an EMV chip card with Java," Sep. 8, 2006, WordPress, pp. 1-13.

Author Unknown, "Global expansion of card tapping mobile OTP for security and convenience is imminent," Jun. 28, 2022, website: https://www.swidch.com/blogs/card-tapping-motp-blog.

* cited by examiner

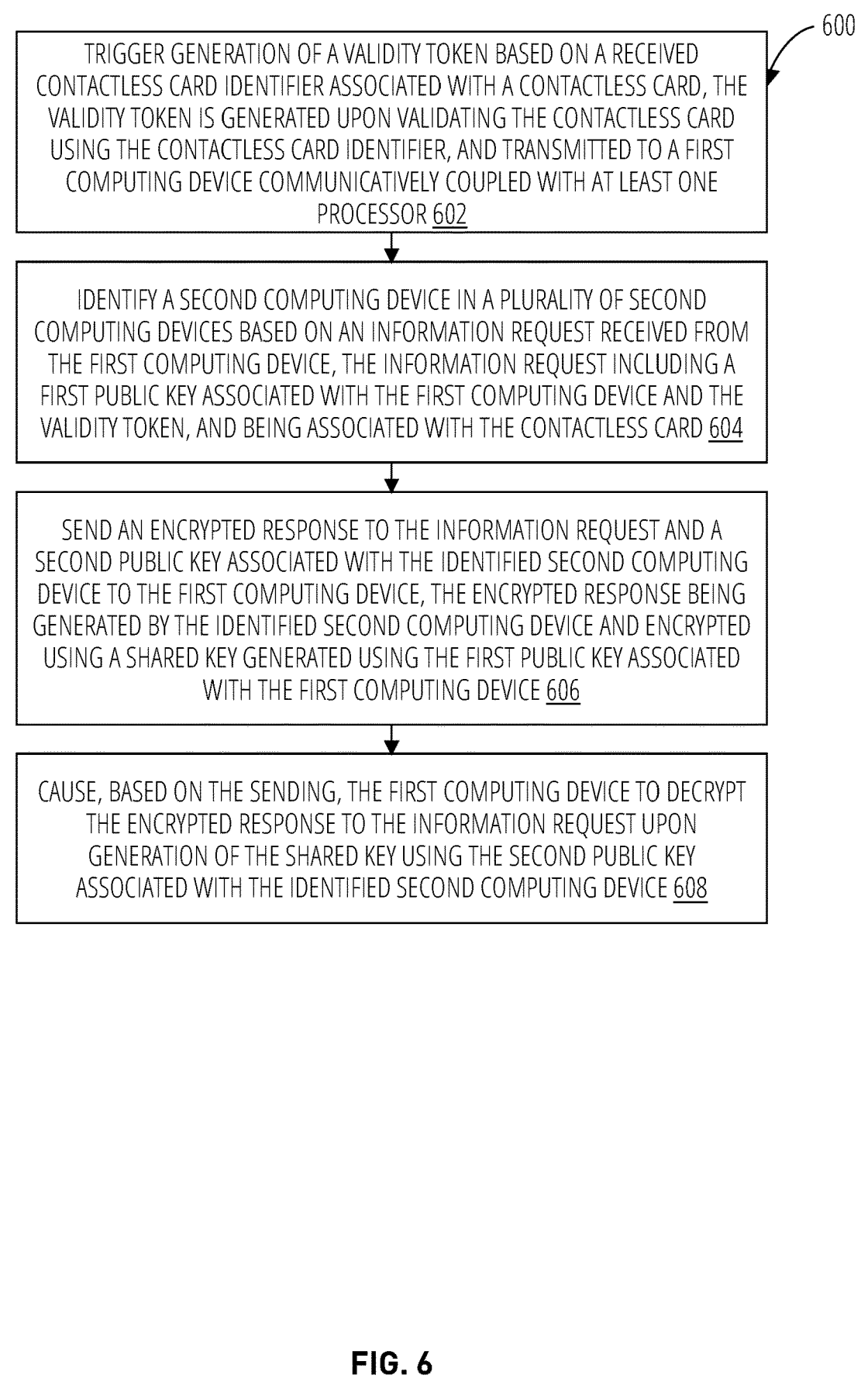

600

TRIGGER GENERATION OF A VALIDITY TOKEN BASED ON A RECEIVED CONTACTLESS CARD IDENTIFIER ASSOCIATED WITH A CONTACTLESS CARD, THE VALIDITY TOKEN IS GENERATED UPON VALIDATING THE CONTACTLESS CARD USING THE CONTACTLESS CARD IDENTIFIER, AND TRANSMITTED TO A FIRST COMPUTING DEVICE COMMUNICATIVELY COUPLED WITH AT LEAST ONE PROCESSOR 602

IDENTIFY A SECOND COMPUTING DEVICE IN A PLURALITY OF SECOND COMPUTING DEVICES BASED ON AN INFORMATION REQUEST RECEIVED FROM THE FIRST COMPUTING DEVICE, THE INFORMATION REQUEST INCLUDING A FIRST PUBLIC KEY ASSOCIATED WITH THE FIRST COMPUTING DEVICE AND THE VALIDITY TOKEN, AND BEING ASSOCIATED WITH THE CONTACTLESS CARD 604

SEND AN ENCRYPTED RESPONSE TO THE INFORMATION REQUEST AND A SECOND PUBLIC KEY ASSOCIATED WITH THE IDENTIFIED SECOND COMPUTING DEVICE TO THE FIRST COMPUTING DEVICE, THE ENCRYPTED RESPONSE BEING GENERATED BY THE IDENTIFIED SECOND COMPUTING DEVICE AND ENCRYPTED USING A SHARED KEY GENERATED USING THE FIRST PUBLIC KEY ASSOCIATED WITH THE FIRST COMPUTING DEVICE 606

CAUSE, BASED ON THE SENDING, THE FIRST COMPUTING DEVICE TO DECRYPT THE ENCRYPTED RESPONSE TO THE INFORMATION REQUEST UPON GENERATION OF THE SHARED KEY USING THE SECOND PUBLIC KEY ASSOCIATED WITH THE IDENTIFIED SECOND COMPUTING DEVICE 608

FIG. 6

700

RECEIVE A VALIDITY TOKEN GENERATED USING A CONTACTLESS CARD IDENTIFIER ASSOCIATED WITH A CONTACTLESS CARD <u>702</u>

TRANSMIT THE VALIDITY TOKEN TO A FIRST COMPUTING DEVICE <u>704</u>

IDENTIFY A SECOND COMPUTING DEVICE IN A PLURALITY OF SECOND COMPUTING DEVICES BASED ON AN INFORMATION REQUEST RECEIVED FROM THE FIRST COMPUTING DEVICE, THE INFORMATION REQUEST INCLUDING A FIRST PUBLIC KEY ASSOCIATED WITH THE FIRST COMPUTING DEVICE AND THE VALIDITY TOKEN, AND BEING ASSOCIATED WITH THE CONTACTLESS CARD, WHERE THE IDENTIFIED SECOND COMPUTING DEVICE GENERATES AN ENCRYPTED RESPONSE TO THE INFORMATION REQUEST <u>706</u>

CAUSE THE FIRST COMPUTING DEVICE TO DECRYPT THE ENCRYPTED RESPONSE TO THE INFORMATION REQUEST UPON GENERATION OF A SHARED KEY USING A SECOND PUBLIC KEY ASSOCIATED WITH THE IDENTIFIED SECOND COMPUTING DEVICE <u>708</u>

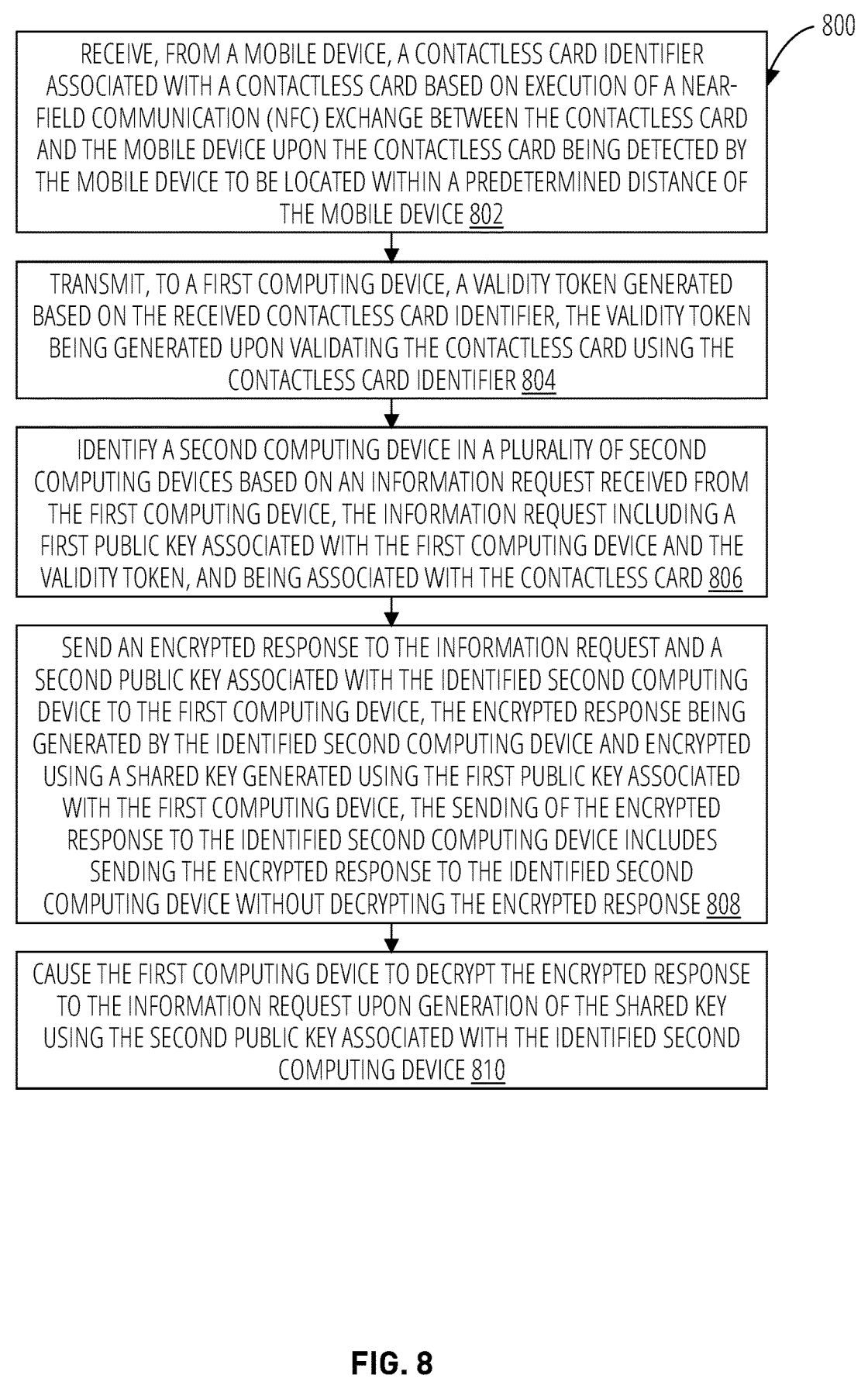

RECEIVE, FROM A MOBILE DEVICE, A CONTACTLESS CARD IDENTIFIER ASSOCIATED WITH A CONTACTLESS CARD BASED ON EXECUTION OF A NEAR-FIELD COMMUNICATION (NFC) EXCHANGE BETWEEN THE CONTACTLESS CARD AND THE MOBILE DEVICE UPON THE CONTACTLESS CARD BEING DETECTED BY THE MOBILE DEVICE TO BE LOCATED WITHIN A PREDETERMINED DISTANCE OF THE MOBILE DEVICE 802

TRANSMIT, TO A FIRST COMPUTING DEVICE, A VALIDITY TOKEN GENERATED BASED ON THE RECEIVED CONTACTLESS CARD IDENTIFIER, THE VALIDITY TOKEN BEING GENERATED UPON VALIDATING THE CONTACTLESS CARD USING THE CONTACTLESS CARD IDENTIFIER 804

IDENTIFY A SECOND COMPUTING DEVICE IN A PLURALITY OF SECOND COMPUTING DEVICES BASED ON AN INFORMATION REQUEST RECEIVED FROM THE FIRST COMPUTING DEVICE, THE INFORMATION REQUEST INCLUDING A FIRST PUBLIC KEY ASSOCIATED WITH THE FIRST COMPUTING DEVICE AND THE VALIDITY TOKEN, AND BEING ASSOCIATED WITH THE CONTACTLESS CARD 806

SEND AN ENCRYPTED RESPONSE TO THE INFORMATION REQUEST AND A SECOND PUBLIC KEY ASSOCIATED WITH THE IDENTIFIED SECOND COMPUTING DEVICE TO THE FIRST COMPUTING DEVICE, THE ENCRYPTED RESPONSE BEING GENERATED BY THE IDENTIFIED SECOND COMPUTING DEVICE AND ENCRYPTED USING A SHARED KEY GENERATED USING THE FIRST PUBLIC KEY ASSOCIATED WITH THE FIRST COMPUTING DEVICE, THE SENDING OF THE ENCRYPTED RESPONSE TO THE IDENTIFIED SECOND COMPUTING DEVICE INCLUDES SENDING THE ENCRYPTED RESPONSE TO THE IDENTIFIED SECOND COMPUTING DEVICE WITHOUT DECRYPTING THE ENCRYPTED RESPONSE 808

CAUSE THE FIRST COMPUTING DEVICE TO DECRYPT THE ENCRYPTED RESPONSE TO THE INFORMATION REQUEST UPON GENERATION OF THE SHARED KEY USING THE SECOND PUBLIC KEY ASSOCIATED WITH THE IDENTIFIED SECOND COMPUTING DEVICE 810

FIG. 8

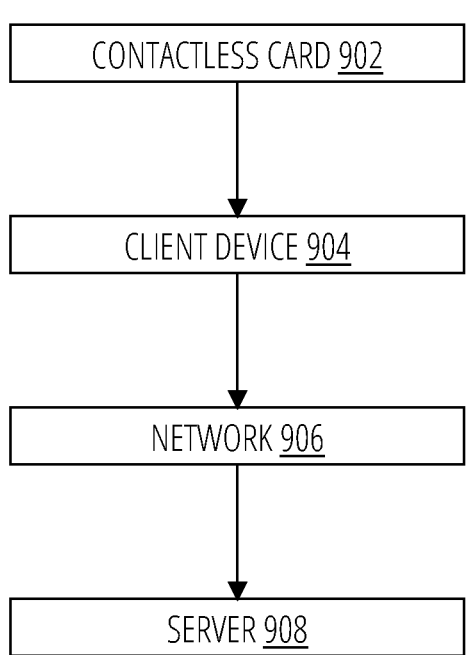
FIG. 9

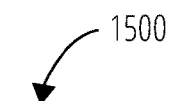
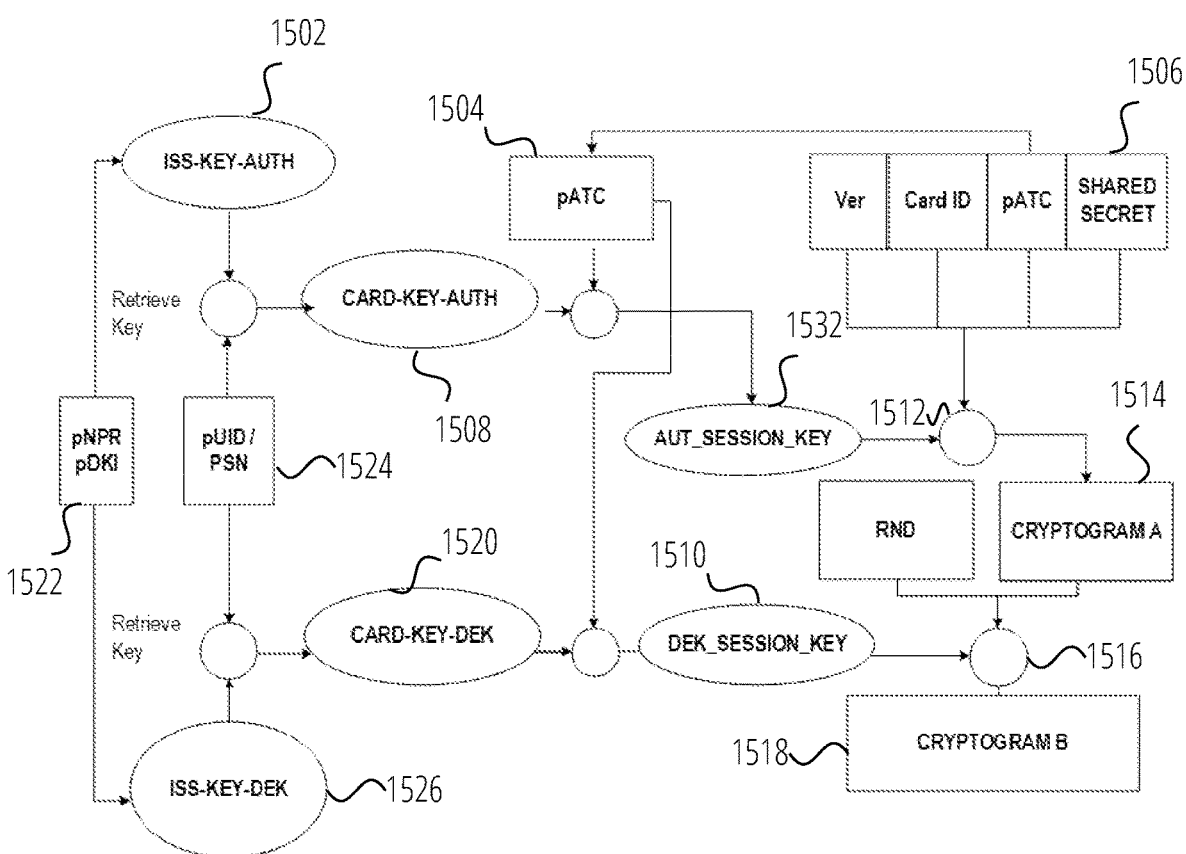
FIG. 15

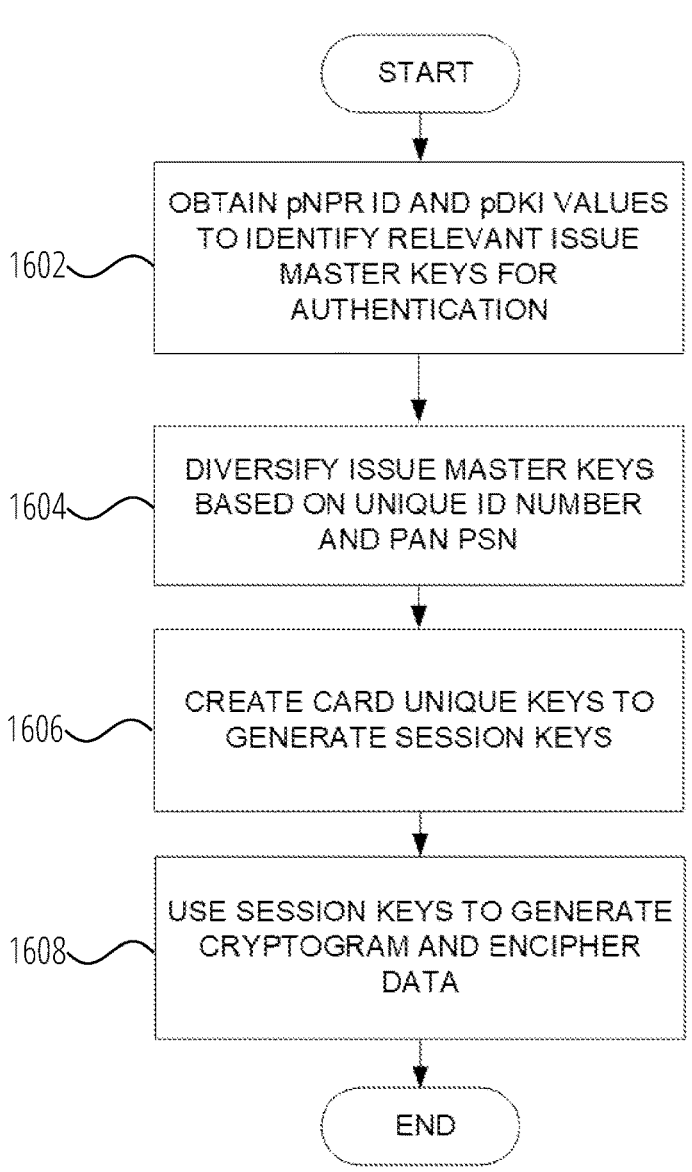
START
1602 — OBTAIN pNPR ID AND pDKI VALUES TO IDENTIFY RELEVANT ISSUE MASTER KEYS FOR AUTHENTICATION
1604 — DIVERSIFY ISSUE MASTER KEYS BASED ON UNIQUE ID NUMBER AND PAN PSN
1606 — CREATE CARD UNIQUE KEYS TO GENERATE SESSION KEYS
1608 — USE SESSION KEYS TO GENERATE CRYPTOGRAM AND ENCIPHER DATA
END
FIG. 16

TRANSMISSION OF SECURE AND AUTHENTICATED DATA OVER A NETWORK

TECHNICAL FIELD

This disclosure relates generally to data processing and, in particular, to an ability to transmit various data, including secure and/or authenticated data over a network.

BACKGROUND

Tap-to-pay transactions have become some of the most popular ways of paying for goods and services. Tap-to-pay is based on radio-frequency identification (RFID) technology that may be embedded into credit cards, smartphones, and other mobile devices. This technology allows users to make credit card transactions by bringing their cards and/or smartphones within a specific distance of (or tapping on) specific areas of point-of-sale terminals, which enables transfer of certain data for the purposes of making a payment. To ensure that data exchanged by the parties (e.g., merchant, cardholder, contactless card issuer, etc.) during such transaction is secure, such data may be encrypted and transmitted over a network, which may or may not be trusted by the parties to the transaction. Moreover, to prevent unauthorized use of the transmitted data, the parties to the transaction may prefer that any operators of such network or any communication hubs are not privy to the transmitted.

SUMMARY

In some implementations, the current subject matter relates to a computer-implemented method for transmission of data, such as, secure and/or authenticated data, over a network. The method may include triggering, using at least one processor, generation of a validity token based on a received contactless card identifier associated with a contactless card. The validity token may be generated upon validating the contactless card using the contactless card identifier, and transmitted to a first computing device communicatively coupled with at least one processor. The method may also include identifying a second computing device in a plurality of second computing devices based on an information request received from the first computing device. The information request may include a first public key associated with the first computing device and the validity token, and may be associated with the contactless card. The method may include sending an encrypted response to the information request and a second public key associated with the identified second computing device to the first computing device. The encrypted response may be generated by the identified second computing device and encrypted using a shared key generated using the first public key associated with the first computing device. The method may further include causing, based on the sending, the first computing device to decrypt the encrypted response to the information request upon generation of the shared key using the second public key associated with the identified second computing device.

In some implementations, the current subject matter may include one or more of the following optional features. The sending of the encrypted response to the identified second computing device may include sending the encrypted response to the identified second computing device without decrypting the encrypted response.

In some implementations, the contactless card identifier may be received from a mobile device communicatively coupled to at least one processor. The contactless card identifier may be received in response to the executing a near-field communication (NFC) exchange between the contactless card and the mobile device upon the contactless card being detected by the mobile device to be located within a predetermined distance of the mobile device. The contactless card identifier may include a contactless card number.

In some implementations, the identifying may include extracting information stored in at least one field of the validity token included in the information request, and identifying the second computing device using the information stored in at least one field of the validity token. Generation of the encrypted response may include a comparison of information identifying the first computing device stored in at least another field of the validity token and the first public key. The first computing device may be validated upon the information identifying the first computing device stored in at least another field of the validity token matching the first public key. Generation of the encrypted response may also include validation of the first public key associated with the first computing device. The encrypted response may be generated upon validation of the information identifying the first computing device stored in at least another field of the validity token and validation of the first public key associated with the first computing device.

In some implementations, the shared key may be generated using an elliptic-curve Diffie-Hellman key agreement protocol.

In some implementations, causing the first computing device to decrypt the encrypted response may also include validation of the second public key associated with the second computing device. This causing operation may also include a comparison of information identifying the second computing device stored in at least one field of the validity token and the second public key. The second computing device may be validated upon the information identifying the second computing device stored in at least one field of the validity token matching the second public key. The encrypted response may be decrypted, using the shared key, upon validation of the information identifying the second computing device stored in at least one field of the validity token and validation of the second public key associated with the second computing device.

In some implementations, at least one of the first and second computing devices may be associated with an issuer of the contactless card.

In some implementations, the contactless card may include at least one of the following: a credit card, a debit card, an electronic gift card, a pre-paid credit card, a pre-paid debit card, and any combination thereof.

In some implementations, the current subject matter relates to a system for transmission of information over a network. The system may include at least one processor, and at least one non-transitory storage media storing instructions, that when executed by at least one processor, cause at least one processor to perform the following operations. The operations may include receiving a validity token generated using a contactless card identifier associated with a contactless card, transmitting the validity token to a first computing device, identifying a second computing device in a plurality of second computing devices based on an information request received from the first computing device, the information request including a first public key associated with the first computing device and the validity token, and being associated with the contactless card, the identified second computing device generating an encrypted response to the information request, and causing the first computing device to decrypt the encrypted response to the information request upon generation of a shared key using a second public key associated with the identified second computing device.

In some implementations, the current subject matter may include one or more of the following optional features. The validity token may be generated upon validating the contactless card using the contactless card identifier. The operations may also include sending the encrypted response to the information request and the second public key associated with the identified second computing device to the first computing device, where the encrypted response may be generated by the identified second computing device and encrypted using the shared key generated using the first public key associated with the first computing device. The identifying operation may include extracting information stored in at least one field of the validity token included in the information request, and identifying the second computing device using the information stored in at least one field of the validity token. Generation of the encrypted response may include a comparison of information identifying the first computing device stored in at least another field of the validity token and the first public key. The first computing device may be validated upon the information identifying the first computing device stored in at least another field of the validity token matching the first public key.

In some implementations, the current subject matter relates to a computer program product comprising a non-transitory machine-readable medium storing instructions that, when executed by at least one programmable processor, cause at least one programmable processor to perform operations that may include receiving, from a mobile device, a contactless card identifier associated with a contactless card based on execution of a near-field communication (NFC) exchange between the contactless card and the mobile device upon the contactless card being detected by the mobile device to be located within a predetermined distance of the mobile device; transmitting, to a first computing device, a validity token generated based on the received contactless card identifier, the validity token being generated upon validating the contactless card using the contactless card identifier; identifying a second computing device in a plurality of second computing devices based on an information request received from the first computing device, the information request including a first public key associated with the first computing device and the validity token, and being associated with the contactless card; sending an encrypted response to the information request and a second public key associated with the identified second computing device to the first computing device, the encrypted response being generated by the identified second computing device and encrypted using a shared key generated using the first public key associated with the first computing device, the sending of the encrypted response to the identified second computing device may include sending the encrypted response to the identified second computing device without decrypting the encrypted response; and causing the first computing device to decrypt the encrypted response to the information request upon generation of the shared key using the second public key associated with the identified second computing device.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 6 illustrates an example of a process that may be performed in connection with execution of a transaction, according to some implementations of the current subject matter;

FIG. 7 illustrates another example of a process that may be performed in connection with execution of a transaction, according to some implementations of the current subject matter;

FIG. 8 illustrates yet another example of a process that may be performed in connection with execution of a transaction, according to some implementations of the current subject matter;

FIG. 9 illustrates an aspect of the subject matter in accordance with one embodiment;

FIG. 15 is a diagram of a key system according to an example embodiment;

FIG. 16 is a flowchart of a method of generating a cryptogram according to an example embodiment;

DETAILED DESCRIPTION

Figure 1:
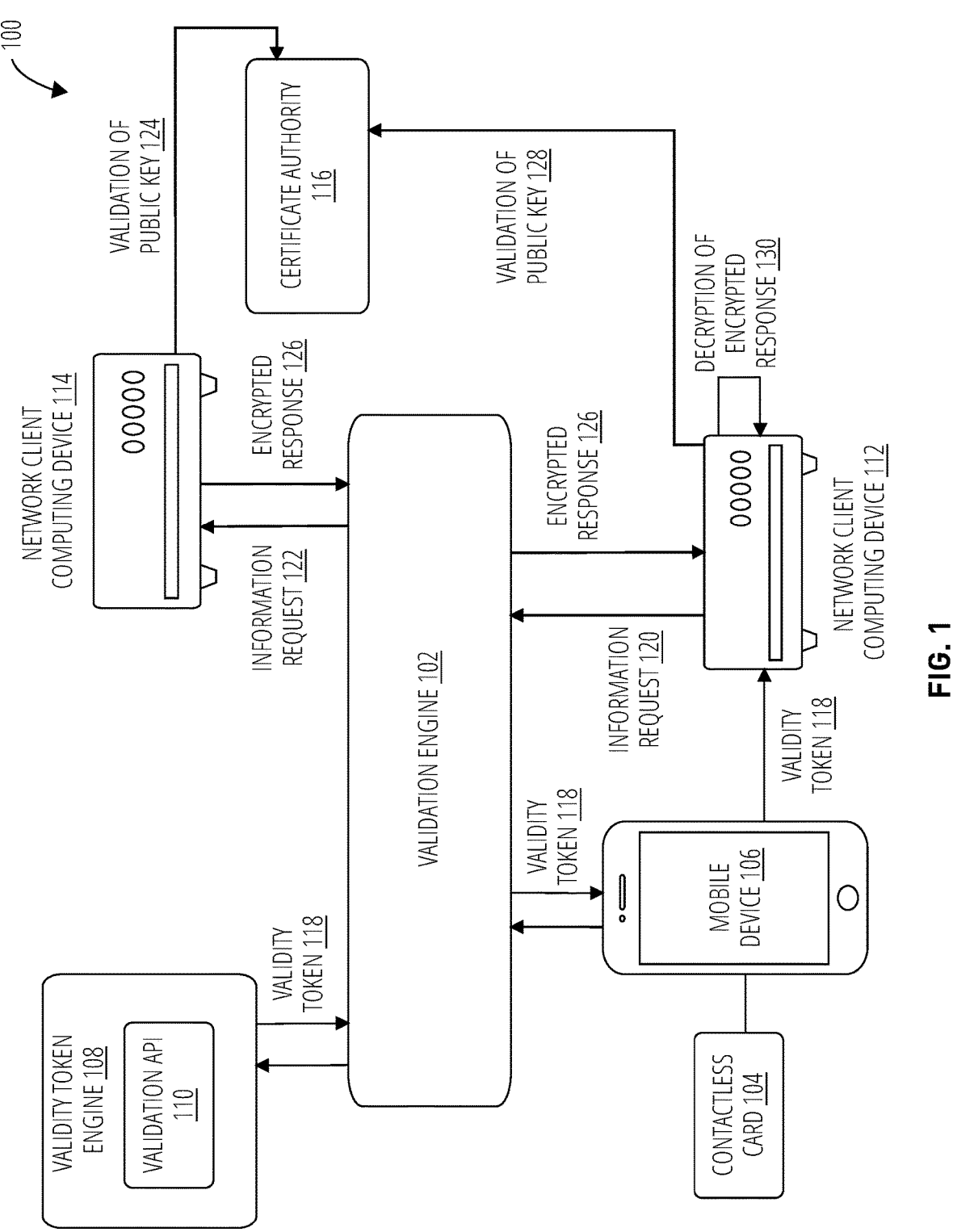
FIG. 1 illustrates an example system for validation and transmission of information in connection with a transaction, according to some implementations of the current subject matter.

To address these and potentially other deficiencies of currently available solutions, one or more implementations of the current subject matter relate to methods, systems, articles of manufacture, and the like that can, among other possible advantages, provide an ability transmit secure and/ or authenticated data over a network, such as, for example, a network that might not be trusted by the parties transmitting and receiving data over it.

In some implementations, the current subject matter generally relates to an ability to use a contactless card and a mobile device to initiate transmission of data over a network. The transmitted data may be secure and authenticated data, such as, for example, cardholder data that has been validated with the issuer of the contactless card. Transmission of such data may be desired during point-of-sale transactions at a merchant location (e.g., a physical location, a virtual location, a website, a mobile app, etc.). As part of such transactions, such as, for example, tap to pay, tap to verify, etc., a user of the contactless card may tap their card on a mobile device (e.g., a mobile terminal, a smartphone, a tablet, etc.). The mobile device may be a merchant's mobile device and/or user's mobile device. As a result of tapping the contactless card, the merchant may request certain data related to the contactless card to be transmitted to the merchant for processing of the transaction. This may include, for example, but not limited, to the contactless card number, expiration data, CVV number, name of the contactless card holder, and/or any other data. The data may be stored by the issuer (e.g., a bank, a financial institution, etc.) of the contactless card. The issuer of the contactless card typically does not share any of the data relating to the cards issued by it without proper validation/authentication.

The merchant's request may be transmitted through a validation hub or an engine that may be configured to determine how to route the request. It may determine a specific contactless card issuer that may be a destination of the request. Once such determination is made, the request is routed to this destination for further processing. The validation engine may provide validation functionalities and/or serve as a certificate authority that may ensure that any requests and/or data are properly routed to the intended destinations. Further, the validation engine may also preserve history of transactions and provide an auditing trail for any requests and/or associated responses.

Upon receipt of the request, the issuer may validate it and retrieve data that may be responsive to the request. Validation may be executed using various validation mechanisms and/or through use of a separate certificate authority that may validate information associated with merchant. This may ensure that the contactless card data stored by the issuer is not seen by an unauthorized merchant. Once validation is complete, the issuer may retrieve contactless card data from one or more of its storage locations and/or database. The retrieved information may then be encrypted. The encrypted information is transmitted via the validation hub to the merchant. The validation hub may serve as a transient point during transmission of the data and does not become privy to the data. This serves as an assurance to the issuer of the contactless card that the data will not be compromised and/or used in any other unintended way by the validation hub while at the same time being securely transmitted to the merchant.

In some implementations, the current subject matter may be configured to execute a process for data transmission through a network. The process may be executed using a validation engine that may provide data transmission as well as data validation functionalities. The process may be executed in a computing environment that may be accessible via a contactless card and a computing device, such as a mobile device. In particular, to access the computing environment, the contactless card may be tapped on the mobile device. As a result, a contactless card identifier associated with the contactless card may be transmitted to the mobile device. In turn, the mobile device may transmit the contactless card identifier to the validation engine and/or to, for example, a backend server and/or any other computing device that may, in turn, send it to the validation engine.

Upon receipt of the contactless card identifier, the validation engine may trigger generation of a validity token based on the received contactless card identifier. The validity token may be generated by a validity token engine and/or the validation engine upon validating the contactless card using the contactless card identifier. The validation engine may then transmit the validity token to a first computing device, which may be a server. In the above merchant transaction example, the first computing device or server may part of the merchant's backend network and may be used to process various data associated with transactions that may be executed at merchant's point-of-sale locations (e.g., physical locations, virtual locations, mobile apps, websites, etc.).

The first computing device may then generate an information request to retrieve information related to the contactless card. The information sought by the merchant may include contactless card data that may be stored by the issuer of the contactless card, such as, for example, but not limited to, contactless card number, expiration date, CVV number, name of the cardholder, address of the cardholder, and/or any other information that may be needed to execute the transaction. The information request may include the validity token and a public key associated with the first computing device (and/or the merchant). The information request may also encode various information about the first computing device (and/or the merchant), such as for example, one or more identifiers associated with the merchant and/or the first computing device, transaction identifiers, etc.

The validation engine may also use the information contained in the information request to identify an issuer of the contactless card. For example, since the information request includes the validity token, the validation engine may use it to identify the issuer of the contactless card. The validity token may include one or more fields that may store information about the issuer of the contactless card (e.g., issuer's identifier, name, etc.), which may be used by the validation to determine the issuer. Based on the determination of the name of the issuer of the contactless card, the validation engine may identify a second computing device or a server associated with the issuer of the contactless card.

The validation engine may then send the information request to the second computing device for processing.

Upon receipt of the information request, the issuer may perform one or more verification and/or validation procedures to ascertain authenticity of the request and the merchant that issued it. It may validate the merchant's name that may be contained in the validity token with the public key that was received as part of the information request. A issuer may communicate with a certificate authority, which may be associated with the validation engine, to ascertain validity of merchant's information.

Once merchant's information has been validated, the issuer's second computing device may generate a shared key using the public key that it received from the first computing device. The shared key may be generated using elliptic-curve Diffie-Hellman (ECDH) key agreement protocol and/or any other protocol. The second computing device may then retrieve information sought by the information request and encrypt it using the shared key to generate an encrypted response. The second computing device may also associate its public key with the generated encrypted response. The issuer's public key may be associated with the issuer's second computing device.

In some implementations, generation of the encrypted response may include a comparison of information identifying the first computing device stored in one or more fields of the validity token and the first public key. The first computing device may be validated upon the information identifying the first computing device stored in the field(s) of the validity token matching the first public key. As part of the generation of encrypted response process, the public key of the merchant may be appropriate validated (e.g., by a certificate authority).

The encrypted response and the issuer's public key may be sent to the first computing device. The transmission may be directly sent to the first computing device and/or sent via the validation engine. The validation engine is unable to decrypt the encrypted response as it does not have the keys that may be required to generate a shared key for decrypting the response.

The merchant's first computing device may be configured to receive the encrypted response. Prior to decryption, the first computing device may be configured to communicate with the certificate authority to validate the issuer's public key. Validation may include a comparison of information identifying the second computing device stored in one or more fields of the validity token and the second public key. The issuer's second computing device may be validated upon the information identifying the second computing device stored in the field(s) of the validity token matching the second public key. Once confirmation of validity of the issuer's public key is received, the first computing device may be configured to validate the issuer's information (e.g., identifier, name, etc. of the issuer and/or the second computing device). After completing the validations, the first computing device may be configured to generate a shared key using issuer's public key. The first computing device may use ECDH protocol and/or any other protocol to generate the shared key. Using the generated shared key, the first computing device may decrypt the encrypted response from the issuer.

In some implementations, communications between the contactless card and the mobile device and/or the contactless card and the merchant's point of sale terminal(s) may be performed using a near-field communication (NFC) exchange link. The NFC exchange link may be executed as a result of the contactless card being detected by the mobile device to be located within a predetermined distance of the mobile device.

In some implementations, the contactless card may be a credit card, a debit card, an electronic gift card, a pre-paid credit card, a pre-paid debit card, and any combination thereof. As can be understood, the above process may be used in any desired computing environment, and is not limited to the contactless cards and/or validations of various merchant/issuer information through use of certificate authority. For example, the validation processes and transmission of data may be related to validation/transmission/decryption/etc. of various sensitive document, e.g., financial documents, personal documents, etc.

FIG. 1 illustrates an example system 100 for validation and transmission of information in connection with a transaction, according to some implementations of the current subject matter. The transaction may be any type of activity, transaction, etc. and/or any execution of an activity, transaction, etc., such as, for example, but not limited to, a purchasing transaction, a transmission of information, a storage of information, data, etc., a validation of information, data, etc., and/or any other type of activity, transaction, and/or any combinations thereof. The system 100 may include a validation engine 102, a contactless card 104, a mobile device 106, a validity token engine 108 having a validation application programming interface (API) 110, a first network client computing device or server 112, a second computing device or server 114, and a certificate authority 116. In the above example of execution of a purchasing transaction, the first computing device 112 may be associated with a merchant, e.g., one or more servers in the merchant's computing network, and the second computing device 114 may be associated with an issuer of the contactless card 104, e.g., one or more servers in the issuer's computing network.

One or more components of the system 100 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 100 may include any combination of hardware and/or software. In some implementations, one or more components of the system 100 may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example implementations, one or more components of the system 100 may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with validation processes disclosed herein.

In some implementations, the system 100's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 100 also may be mobile computing devices, for example, an iPhone, iPod, iPad from Apple® and/or any other suitable device running Apple's iOS® operating system, any device running Microsoft's Windows® Mobile operating system, any device running Google's Android® operating system, and/or any other suitable mobile computing device, such as a smartphone, a tablet, or like wearable mobile device.

One or more components of the system 100 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. One or more components of the environment 100 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example implementations, one or more components of the environment 100 may execute one or more applications, such as software applications, that enable, for example, network communications with one or more components of environment 100 and transmit and/or receive data.

One or more components of the environment 100 may include and/or be in communication with one or more servers via one or more networks and may operate as a respective front-end to back-end pair with one or more servers. One or more components of the environment 100 may transmit, for example from a mobile device application (e.g., executing on one or more user devices, components, etc.), one or more requests to one or more servers (e.g., server(s) 106). The requests may be associated with retrieving data from servers. The servers may receive the requests from the components of the system 100. Based on the requests, servers may be configured to retrieve the requested data from one or more databases (e.g., database 110, as shown in FIG. 1). Based on receipt of the requested data from the databases, the servers may be configured to transmit the received data to one or more components of the system 100, where the received data may be responsive to one or more requests.

The system 100 may include one or more networks, such as, for example, networks that may be communicatively coupling the mobile device 104, the computing device 108 and/or one or more servers 110 and/or 112. In some implementations, networks may be one or more of a wireless network, a wired network or any combination of wireless network and wired network and may be configured to connect the components of the system 100 and/or the components of the system 100 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 100 may include one or more servers, which may include one or more processors that maybe coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 100.

One or more components of the system 100 may be configured to execute one or more transactions using one or more containers. In some implementations, each transaction may be executed using its own container. A container may refer to a standard unit of software that may be configured to include the code that may be needed to execute the action along with all its dependencies. This may allow execution of actions to run quickly and reliably.

In some implementations, as discussed above, the system 100 may be used in connection with executing a transaction using the contactless card 104 and the mobile device 106. In particular, a transaction may be initiated using near-field communications (NFC) exchange link that may be established between the contactless card 104 and the mobile device 106. To enable use of the NFC technology, a user (not shown in FIG. 1) may bring the contactless card 104 within a certain boundary of the mobile device 106 (e.g., tap the card 104 on the mobile device 106 or hold the card 104 near the mobile device 106 without tapping), whereby the mobile device 106 may be configured to detect presence of the contactless card 104 within its boundary and execute one or more operations discussed herein. As can be understood, the mobile device 106 may be associated with the user (e.g., user's smartphone, tablet, etc.) and/or with the merchant (e.g., merchant's mobile point-of-sale terminal, etc.).

In the NFC exchange link, the mobile device 106 may act as an active component and provide power to energize the contactless card 104, which may be a passive component. Using the NFC exchange link, the mobile device 106 and the contactless card 104 may exchange various data, such as, for instance, for the purposes of identification of the contactless card 104 and/or transmission of a contactless card identifier. The contactless card identifier may include a contactless card number and/or any other information identifying the contactless card.

The mobile device 106 may transmit the contactless card identifier to the validity engine 102. The validation engine 102 may be configured to execute one or more authentication/authorization protocols (e.g., OAuth 2.0, etc.) to analyze the received contactless card identifier. In some example implementations, the validation engine 102 may be configured to use the contactless card identifier to determine the validity token 118 may include additional fields that may be specifically related to the merchant, e.g., merchant's name, merchant identifier, merchant address, etc. Further, the validity token may also include one or more fields storing information related to the transaction that may be executed by the merchant, and thus, may be transaction specific and/or valid only in connection with the transaction. The data stored in the fields may be in any desired format, such as, for example, but not limited to, alpha-numeric and/or any other characters.

| Fields | Issuer ... Name | Issuer Identifier | Issuer Address | ... | Merchant Name | Merchant Identifier | Merchant Address | ... Transaction |
|---|---|---|---|---|---|---|---|---|
| Data | ... | | | ... | | | ... | | an issuer of the contactless card. For example, if the contactless card identifier is a credit card number, then its number may be broken down into a major industry identifier (MII) (i.e., a type of company that the card is affiliated with, e.g., (3)—American Express, (4)—Visa, (5)—Mastercard, (6)—Discover, etc.), issuer identification number (IIN) or bank identification number (BIN), user's specific account number, and a checksum digit to verify legitimacy of the card. As can be understood, any combination of numbers may be used. The validation engine 102 may be configured to detect one of the above numbers/digits and use it to determine the issuer's information.

The issuer's information may include a name of the issuer, one or more identifiers associated with the issuer, certification information, information related to the issuer's servers, etc. (e.g., computing device 114), and/or any other information that may be used for forwarding data to the issuer's computing device 114. As can be understood, any other information associated with the issuer may be ascertained from the contactless card identifier by the validation engine 102.

Once the issuer information is determined, the validation engine 102 may transmit the contactless card identifier to a validation application programming interface 110 of the validity token engine 108. Receipt of the contactless card identifier from the validation engine 102 may trigger the validity token engine 108 to generate a validity token 118. As can be understood, any way of generating the validity token are possible. The validity token 118 may include a plurality of fields that may be used for storing of information. For example, the validity token engine 108 may package the validity token 118 with the contactless card identifier, the issuer information (e.g., name, identifiers, etc.) determined by the validation engine 102, merchant information, and/or any other information that may be used by various components of the system 100 for identification, verification, authentication, and/or any other functions that may be performed in connection with execution of the transaction. The validity token 118 may, for example, be a JSON web token (JWT) that also be signed and validated using one or more cryptographic signatures.

In some implementations, each set of information stored in the validity token 118 may be associated with one or more fields. For example, as illustrated below, the validity token may include several fields, some of which, for instance, may be dedicated to contactless card issuer information that may include name of the contactless card issuer, identifier of the contactless card issuer, address data of the contactless card issuer (e.g., IP address, email address, etc.), etc. Moreover, The validity token engine 108 may then transmit, via the validation API 110, the validity token 118 to the validation engine 102 for further processing. The validation engine 102 may send the validity token to the mobile device 106, which may, in turn, provide it to the computing device 112 (e.g., merchant's backend server). Alternatively, or in addition, the validation engine 102 may provide the validity token 118 directly to the computing device 112.

Upon receipt of the validity token 118, the computing device 112 may be configured to generate an information request 120. The information request 120 may be related to the transaction that the user of the contactless card 104 may desire to execute with the merchant. The request 120 may seek information about the contactless card 104 and/or its user. The information may, for example, include, but is not limited to, contactless card number, expiration data, CVV number, cardholder information, any warnings related to the contactless card and/or the cardholder, etc.

In some implementations, the information request 120 may be generated by the computing device 112 using the validity token 118 and a public key associated with the computing device 112. The public key may be assigned to the specific computing device 112 and/or the a network computing devices that may include the specific computing device 112. The information request 120 may include any other information that may be needed by the merchant to process the transaction. The computing device 112 may send the generated request 120 to the validation engine 102.

The validation engine 102, upon receipt of the information request 120, may perform analysis of the request and extract various information. For instance, the validation engine 102 may retrieve the validity token 118 from the information request 120. Once the validity token 118 is retrieved, the validation engine 102 may look up contactless card's issuer information that may be stored in one or more fields (e.g., contactless card's issuer's field) of the validity token 118. The retrieved information may then be used by the validation engine 102 to determine routing instructions for the information request 120. The instructions may be generated in accordance with one or more routing policies that may be associated with the issuer, the validation engine 102, and/or any other policies.

Using the routing instructions, the validation engine 102 may forward the information request 122, which may be the same as information request 120 and/or generated based on the information request 120, to the computing device 114. As stated above, in the transaction execution example, the computing device 114 may be server and/or a network of servers that may be associated with the issuer of the contactless card 104. The validation engine 102 may determine the address of one or more of such computing devices 114 and forward the information request 122 to the computing device 114 using the determined address.

The computing device 114 may include one or more APIs (not shown in FIG. 1) that may be used to initially process the received information request 122 and determine one or more subsequent actions to be performed. For example, the computing device 114 may perform one or more validation procedures to validate information contained in the information request 122.

One of the validation procedures may involve extracting information from the validity token 118 contained in the request 122. For example, the computing device 114 may be configured to extract information about the computing device 112, such as, for example, as in the example with the purchasing transaction, name of the merchant, merchant identifier, identifier of the computing device 112, and/or any other information. Further, the computing device 114 may also analyze the public key associated with the computing device 112 that it has received as part of the information request 122 from the validation engine 102. Analysis of the public key may reveal various information about the computing device 112, which may, for example include, ant, merchant identifier, identifier of the computing device 112, and/or any other information. Alternatively, or in addition, the computing device 114 may communicate directly with the computing device 112 to receive the information request, including, the public key associated with the computing device 112 and/or the validity token 118.

Once information is extracted from the validity token 118, the computing device 114 may compare the extracted information with the information contained in the public key associated with the computing device 112. Comparison of the information may be performed to determine whether the received information request 122 is valid and/or has been received from a legitimate source. If the information extracted from the validity token 118 matches the information obtained from the public key associated with the computing device 112, the computing device 114 may determine that the request is valid and may proceed to perform further verification procedures. If the information extracted from the validity 118 does not match the information from the public key associated with the computing device 112, the computing device 114 may determine that the information request 122 is improper and/or may need to be resubmitted. In this case, the computing device 114 may inform the validation engine 102 and/or the computing device 112 directly that the submitted information request 122 cannot be processed.

If the computing device 114 determines that a match exists between the data extracted from the validity token 118 and the data contained in the public key associated with the computing device 112, the computing device 114 may communicate, at 124, with the certificate authority 116 in order to perform validation of the public key associated with the computing device 112. In some implementations, the certificate authority 116 may be a trusted entity that may be configured to store, sign, and/or issue digital certificates that certify ownership of a public key by the named subject of the certificate. For example, the certificate authority may certify that the public key associated with the computing device 112 is owned by the computing device 112 (e.g., the merchant as in the example of the purchasing transaction). The certificate authority 116 may be associated with the validation engine

102 and/or be part of the validation engine 102 and/or be a third party entity that may be independent of the validation engine 102.

Upon receipt of the public key 124 from the computing device 114, the certificate authority 116 may verify the public key. For example, it may retrieve a public key that it has previously issued to the computing device 112 and compare it with the public key 124 that it has received from the computing device 114. Upon determining that the stored public key matches the received public key, the certificate authority 116 may generate a verification message and transmit it to the computing device 114 indicating that the public key is valid. Otherwise, the certificate authority 116 may transmit a message to the computing device 114 indicating that the public key is not valid and/or cannot be verified. If the public key cannot be verified by the certificate authority 116, the computing device 114 may determine that the information request 122 is improper and/or may need to be resubmitted. In this case, the computing device 114 may inform the validation engine 102 and/or the computing device 112 directly that the information request 122 cannot be processed, as submitted.

If the computing device 114 determines that the information contained in the validity token 118 and the public key associated with the computing device 112 matches and receives an indication from the certificate authority 116 that the public key associated with the computing device 112 is valid, the computing device 114 may initiate a process of retrieval of information sought by the information request 122. As in the transaction example above, the computing device 114 may, for instance, query a storage location (e.g., a database) storing cardholder information associated with the contactless card 104 and retrieve appropriate data. As can be understood, the computing device 114 may request/ retrieve any desired information that may be sought by the request 122.

The computing device 114 may package the retrieved information into one or more data packets that may be readable by the computing device 112. In some example implementations, as part of its information request, the computing device 112 may request that the retrieved information is packaged into a data packet in a predetermined way. This may allow the computing device 112 to read the information in its desired format. Alternatively, or in addition, the information may be packaged in a format used by the computing device 114, where the computing device 112 may have appropriate capabilities to read such data packet. As can be understood, the data may be packaged in any desired way.

To transmit the retrieved data to the computing device 112 (either directly or via the validation engine 102), the computing device 114 may be configured to generate a shared key or a shared secret (hereinafter, "shared key") using a public key associated with the computing device 112 (i.e., the merchant's public key). The shared key may be generated using any known algorithm, such as, for example, an elliptic-curve Diffie-Hellman (ECDH) key agreement protocol. ECDH allows two parties to establish a shared secret over an insecure channel, where each party has an elliptic-curve public-private key pair. The shared secret may be used as a key directly. Alternatively, or in addition, the shared secret may be used to derive another key.

The computing device 114 may be configured to use the generated shared key to encrypt the retrieved cardholder information. The computing device 114 may then send the encrypted cardholder information together with its public key to the validation engine 102 and/or directly to the computing device 112, as encrypted response 126.

Upon receipt of the encrypted response 126 that contains the encrypted cardholder data and the public key associated with the computing device 114, the computing device 112 may be configured to perform validation of the public key associated with the computing device 114. To so, the computing device 112 may be configured to communicate with the certificate authority 116 to perform validation of public key 128.

Similar to the verification of the public key associated with the computing device 112, the certificate authority may certify that the public key associated with the computing device 114 is owned by the computing device 114 (e.g., the contactless card issuer as in the example of the purchasing transaction). The certificate authority 116 may be the same certificate authority that validated the public key associated with the computing device 112 and/or may be a different certificate authority. As stated above, the certificate authority 116 may be associated with the validation engine 102 and/or be part of the validation engine 102 and/or be a third party entity that may be independent of the validation engine 102.

Once the public key 128 is received from the computing device 112, the certificate authority 116 may verify it. For instance, the authority 116 may retrieve a public key that it has previously issued to the computing device 114 (i.e., the issuer) and compare it with the public key 128 that it received from the computing device 112. If the stored public key matches the received public key, the certificate authority 116 may generate a verification message and transmit it to the computing device 112 (i.e., the merchant) stating that the received public key is valid. Otherwise, the certificate authority 116 may transmit a message to the computing device 112 indicating that the public key is not valid and/or cannot be verified. If the public key cannot be verified by the certificate authority 116, the computing device 112 may determine that further processing of the transaction might not be possible. It may resubmit the request for information 120, communicate with the computing device 114 to obtain an updated public key (if one exists), and/or terminate the transaction. The computing device 112 may also inform the validation engine 102 and/or the computing device 114 directly that the data it received cannot be decrypted.

If the public key associated with the computing device 114 has been validated by the certificate authority 116, the computing device 112 may be configured to perform verification of the information associated with the computing device 114 by comparing information (e.g., issuer's name, issuer's identifier, etc.) with the information contained in the validity token 118.

If the computing device 112 determines that the information contained in the validity token 118 and the public key associated with the computing device 114 matches and receives an indication from the certificate authority 116 that the public key associated with the computing device 114 is valid, the computing device 112 may initiate a process of retrieval of information from the encrypted response 126.

To retrieve information from the encrypted response 126, the computing device 112 may be configured to generate a shared key using a public key associated with the computing device 114 (i.e., the issuer's public key). The computing device 112 may be configured to generate the shared key using ECDH key agreement protocol. Once the ECDH shared key is generated, the encrypted response 126 may be decrypted to generate decrypted response 130. As can be understood, any other ways of generating the shared key are possible.

In some implementations, the validation engine 102 and the certificate authority 116 may be configured to advantageously provide a secure process for transmission of information between various computing devices that may be communicatively coupled via an untrusted network. During transmission of information between computing devices 112 and 114, the information is not exposed or decrypted by unintended recipients (e.g., validation engine 102 and/or any other third parties). This includes information transmitted from computing device 112 to computing device 114 and vice versa.

Figure 2:
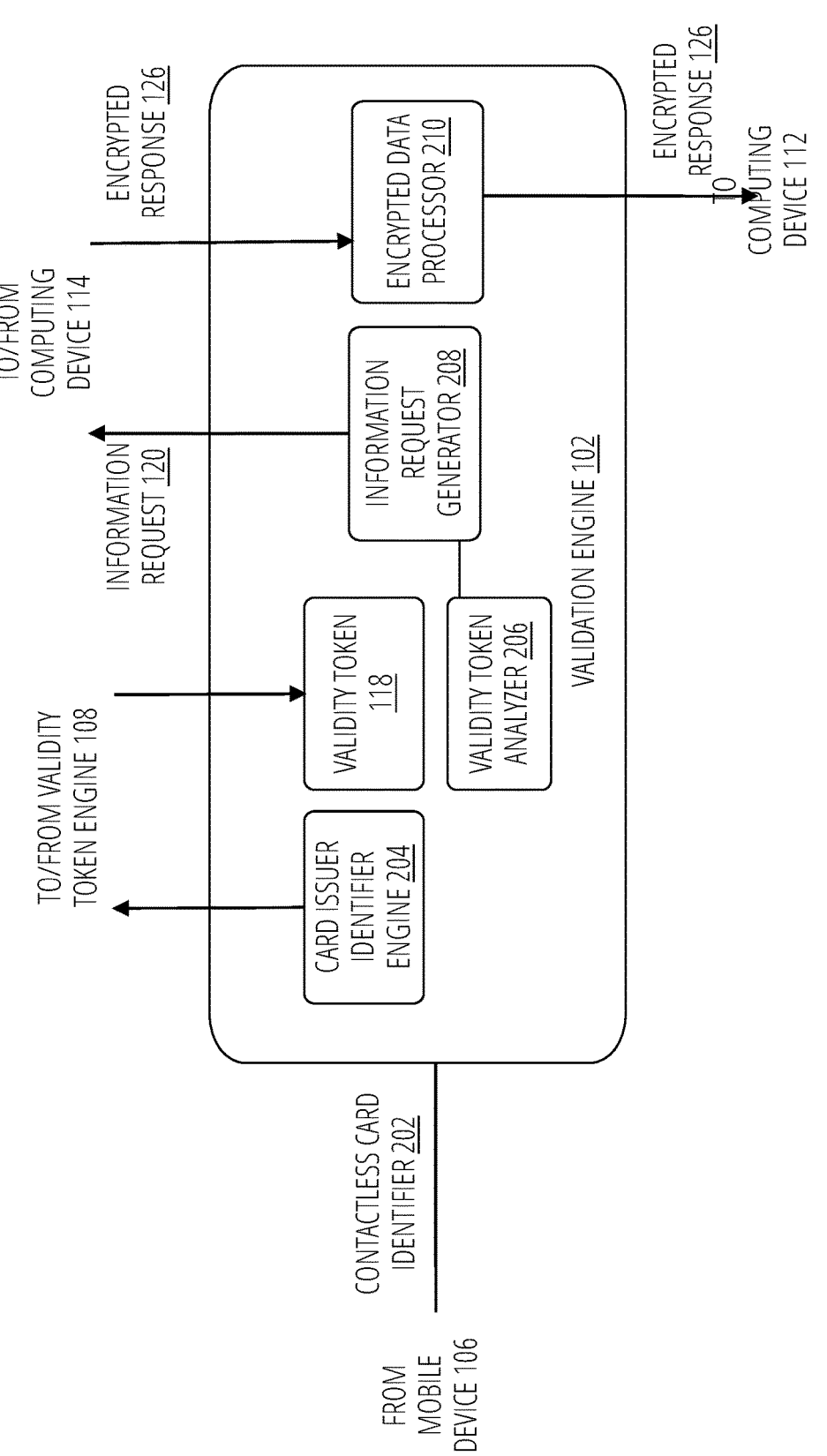
FIG. 2 illustrates an example structure of the validation engine, according to some implementations of the current subject matter.

FIG. 2 illustrates an example structure of the validation engine 102, according to some implementations of the current subject matter. The engine 102 may be configured to include a card issuer identifier engine 204, a validity token analyzer 206, an information request generator 208, and an encrypted data processor 210. The components or modules 204-208 may include any combination of hardware and/or software and/or may be disposed on one or more computing devices, such as, server(s), database(s), personal computer(s), laptop(s), cellular telephone(s), smartphone(s), tablet computer(s), virtual reality devices, and/or any other computing devices and/or any combination thereof. Such components/modules of the validation engine 102 may be disposed on a single computing device and/or may be part of a single communications network and/or may be separately located from one another. The components/modules 204-208 may include, but are not limited to, a computing processor, a memory, a software functionality, a routine, a procedure, a call, and/or any combination thereof that may be configured to execute a particular function associated with validation processes disclosed herein.

As shown in FIG. 2, a contactless card identifier 202 associated with the contactless card 104 (as shown in FIG. 1) may be transmitted to the validation engine 102 from the mobile device 106. The card issuer identifier engine 204 may be configured to process the contactless card identifier 202 to determine the issuer of the contactless card 104. As discussed above, the card issuer identifier engine 204 may be configured to use MII, IIN/BIN, user's specific account number, etc. that may be included in the contactless card identifier 202 and/or any other information that may be transmitted as the contactless card identifier 202 to determine the issuer of the contactless card 104.

Using the contactless card identifier 202, the card issuer identifier engine 204 may be configured to determine the name of the issuer, one or more identifiers associated with the issuer, certification information, information related to the issuer's servers, etc. (e.g., computing device 114), and/or any other information associated with the issuer of the contactless card 104. The card issuer identifier engine 204 may then transmit the contactless card identifier to the validity token engine 108, and in response, receive the validity token 118. An example of the validity token 118 and the information that may be contained therein (e.g., the contactless card identifier, the issuer information (e.g., name, identifiers, etc.), merchant information, and/or any other information) is discussed above in connection with FIG. 1. The validity token 118 may then be transmitted to the mobile device 106 and/or to the computing device 112 (as shown in FIG. 1).

As discussed above, the validity token 118 may be used by the computing device 112 to generate the information request 120, which may be received by the information generator 208 of the validation engine 102. In connection with receipt of the information request 120, the validity token analyzer 206 may be configured to analyze the validity token 118 to determine whether the information contained in one of the fields of the validity token 118 matches information associated with the computing device 114 (e.g., the issuer name in the issuer name field of the validity token matches the issuer's name). Upon determining a match, the validity token analyzer 206 may be configured to inform the information request generator 208 that a match has been found. It may also provide destination information for forwarding the received information request 120. The destination information may be attached to the information request 120 by the information request generator 208. The information request generator 208 may then forward the information request 122 (generated based on the information request 120, the destination address, and/or any other information) to the computing device 114.

Once the computing device 114 processes the information request 122 and determines that it is able to provide a response with information being sought by the information request 122 (including performance of one or more validation procedures discussed above), the encrypted data processor 210 may be configured to receive the encrypted response 126 from the computing device 114. The response 126 may be processed and sent to the computing device 112. The encrypted response processor 210 may be configured to do so without decrypting of the encrypted response 126 and/or without, otherwise, accessing the data contained in the response. This may ensure that the data contained in the encrypted response 126 is securely transmitted via a network that might not be trusted by the computing devices 112 and/or 114.

Figure 3:
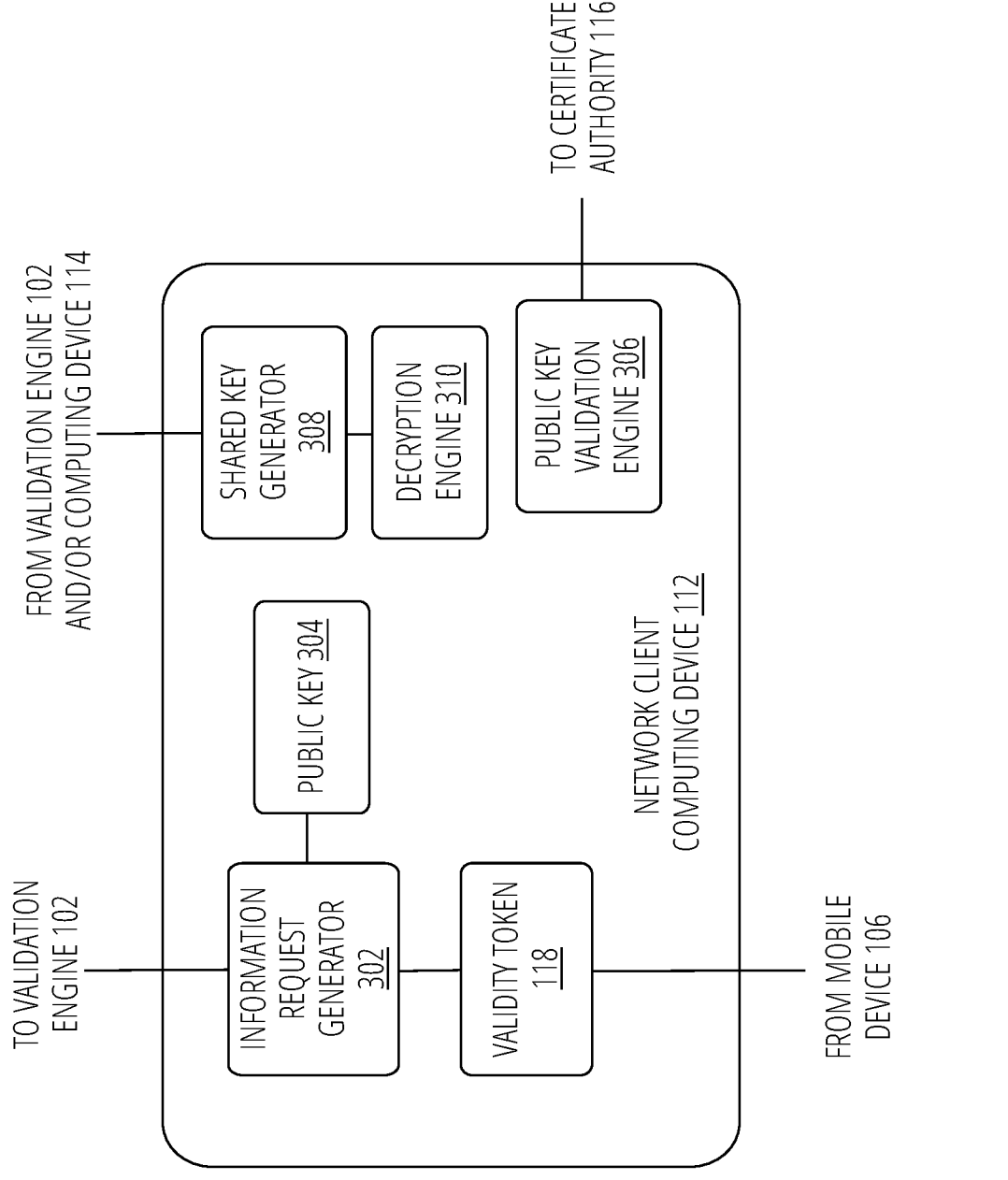
FIG. 3 illustrates an example structure of a network client computing device, according to some implementations of the current subject matter.

FIG. 3 illustrates an example structure of the computing device 112, according to some implementations of the current subject matter. As discussed above, the computing device 112 may be part of the merchant's network, e.g., backend server(s) and/or network of servers. As can be understood, the computing device 112 may be any type of device associated with any entity that may be requesting information associated with the contactless card 104.

The computing device 112 may be configured to include an information request generator 302, a public key validation engine 306, a shared key generator 308, and a decryption engine 310. The components or modules 302, 306, 308, and/or 310 may include any combination of hardware and/or software and/or may be disposed on one or more computing devices, such as, server(s), database(s), personal computer(s), laptop(s), cellular telephone(s), smartphone(s), tablet computer(s), virtual reality devices, and/or any other computing devices and/or any combination thereof. Such components/modules of the computing device 112 may be disposed on a single computing device and/or may be part of a single communications network and/or may be separately located from one another. The components/modules 302, 306, 308, and/or 310 may include, but are not limited to, a computing processor, a memory, a software functionality, a routine, a procedure, a call, and/or any combination thereof that may be configured to execute a particular function associated with validation processes disclosed herein.

The information request generator 302 of the computing device 112 may be configured to generate the information request 120. The information request generator 120 may be generated by the information request generator 302 based on the validity token 118 that received from the mobile device 106 and/or the validation engine 102 (not shown in FIG. 3). As stated above, the information request 120 may seek information related to a particular transaction initiated by the user of the contactless card 104 (as shown in FIG. 1), such as, for example, contactless card number, expiration data, CVV number, cardholder information, any warnings related to the contactless card and/or the cardholder, etc. Further, information request generator 302 may be configured to attach a public key 304 to the information request 120. The public key 304 may be specific to the computing device 112 (e.g., merchant's public key). The public key 304 may have been issued by the certificate authority 116 and provided to the computing device 112. The public key 304 may be periodically updated by the certificate authority 116 to ensure that it has not been corrupted, expired, etc.

The information request generator 302 may be configured to package the information request 120 (including the validity token 118 and the public key 304) in data packet. The data packet may have a predetermined format that may be specified by the particular computing device 114 (e.g., the issuer of the contactless card 104 may prefer to have a specific format in which any requests for information about cardholders of the cards that it issued are transmitted). Once the information request generator 302 packaged the information request 120, it may send it to the validation engine 102 for forwarding to the computing device 114. Alternatively, or in addition, the information request generator 302 may be configured to send the information request 120 directly to the computing device 114.

The shared key generator 308 and the decryption engine 310 may be configured to receive the encrypted response 126 from the computing device 114. As discussed above, the response 126 may be sent to the computing device 112 from the validation engine 102 and/or directly from the computing device 114.

Upon receipt of the encrypted response 126, the public key validation engine 306 may be configured to send a request to the certificate authority 116 to validate the public key associated with the computing device 114, which may have been received as part of the encrypted response 126. Upon receipt of an indication that the public key associated with the computing device 114 is valid, the public key validation engine 306 may inform the shared key generator 308 to initiate shared key generation procedures. In particular, the shared key generator 308 may be configured to validate information associated with the computing device 114. This may involve comparison of the information associated with the computing device 114 (e.g., issuer name, identifier, etc.) as contained in the public key associated with the computing device 114, with information contained in the validity token 118.

The validation process is complete upon the public key validation engine 306 receiving an indication from the certificate authority 116 that the public key associated with the computing device 114 is valid and shared key generator determining that the information contained in that public key matches information in the validity token 118. The shared key generator 308 may then generate a shared key using the public key associated with the computing device 114. As stated above, the shared key may be generated using SCDH key agreement protocol and/or any other key agreement protocol.

The shared key generator 308 may then pass on the shared key to the decryption engine 310. The decryption engine 310 may perform decryption of the received encrypted response 126. Once the encrypted response 126 is decrypted, the decryption engine 310 may extract information that has been sought in its information request 120. In the transaction example above, this information may include cardholder information associated with the contactless card 104.

Figure 4:
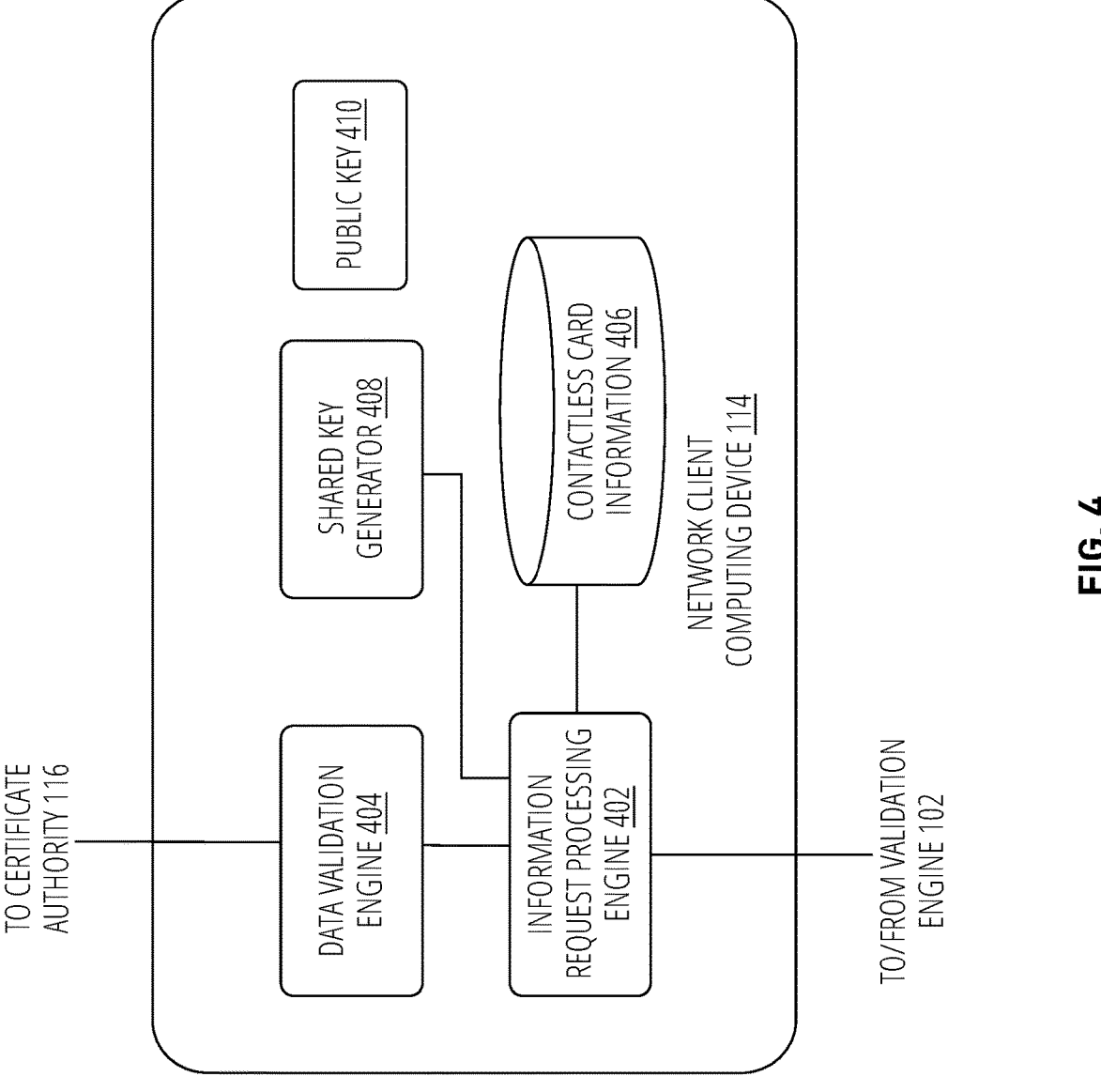
FIG. 4 illustrates an example structure of a network client computing device, according to some implementations of the current subject matter.

FIG. 4 illustrates an example structure of the computing device 114, according to some implementations of the current subject matter. As discussed above, the computing device 114 may be part of the issuer's network, e.g., backend server(s) and/or network of servers. As can be understood, the computing device 114 may be any type of device associated with any entity that may be responding to requests for information associated with the contactless card 104.

The computing device 114 may be configured to include an information request processing engine 402, a data validation engine 404, a contactless card information storage location and/or a database 406, and a shared key generator 408. The components or modules 402-408 may include any combination of hardware and/or software and/or may be disposed on one or more computing devices, such as, server(s), database(s), personal computer(s), laptop(s), cellular telephone(s), smartphone(s), tablet computer(s), virtual reality devices, and/or any other computing devices and/or any combination thereof. The components/modules 402-408 may be disposed on a single computing device and/or may be part of a single communications network and/or may be separately located from one another. Further, the components/modules 402-408 may include, but are not limited to, a computing processor, a memory, a software functionality, a routine, a procedure, a call, and/or any combination thereof that may be configured to execute a particular function associated with validation processes disclosed herein.

The information request processing engine 402 may be configured to receive the information request 122 from the validation engine 102. Prior to processing the information request 122, the data validation engine 404 may be configured to send a request to the certificate authority 116 to validate the public key associated with the computing device 112, which may have been received as part of the information request 122. The data validation engine 404 may also determine the information contained in the validity token 118 matches the information contained in the public key associated with the computing device 112. This may involve comparison of the information associated with the computing device 112 (e.g., merchant's name, identifier, etc.) as contained in the public key associated with the computing device 112, with information contained in the validity token 118.

Upon receipt of an indication that the public key associated with the computing device 112 is valid and that information contained in the public key associated with the computing device 112 matches information contained in the validity token 118, the data validation engine 404 may inform the shared key generator 408 to initiate shared key generation procedures. The shared key generator 408 may generate the shared key using the public key associated with the computing device 112. As stated above, the shared key may be generated using SCDH key agreement protocol and/or any other key agreement protocol.

To generate a response to the information request 122, the information request processing engine 402 may extract requested information (e.g., cardholder data associated with the contactless card 104) from the contactless card information database 406. The extracted information may include, for example, but not limited to, contactless card data, name of the cardholder, etc. The information request processing engine 402 may then encrypt the information using the shared key generated by the shared key generator 408. The information request processing engine 402 may then attach the public key 410 associated with the computing device 114 to the encrypted information to generate encrypted response 126 and send it to the validation engine 102 and/or directly to the computing device 112.

In some implementations, the contactless card information database 406 may be any storage location, e.g., a column-store database, a row-store database, and/or any other type of database and/or storage location. To retrieve data from the database 406, the information request processing engine 402 may generate and execute a search query of the database 406. The query may be any type of query (e.g., SQL query, single-table select query, multi-table select query, range query, complex query, action query, parameter query, crosstab query, and/or any other type of query, and/or combination of queries). The data that may be retrieved from the database 406 may be in any desired format and/or may be formatted in accordance with a predetermined format. The formatting may be performed by one or more components of the computing device 114 (e.g., information request processing engine 402, etc.).

Figure 5:
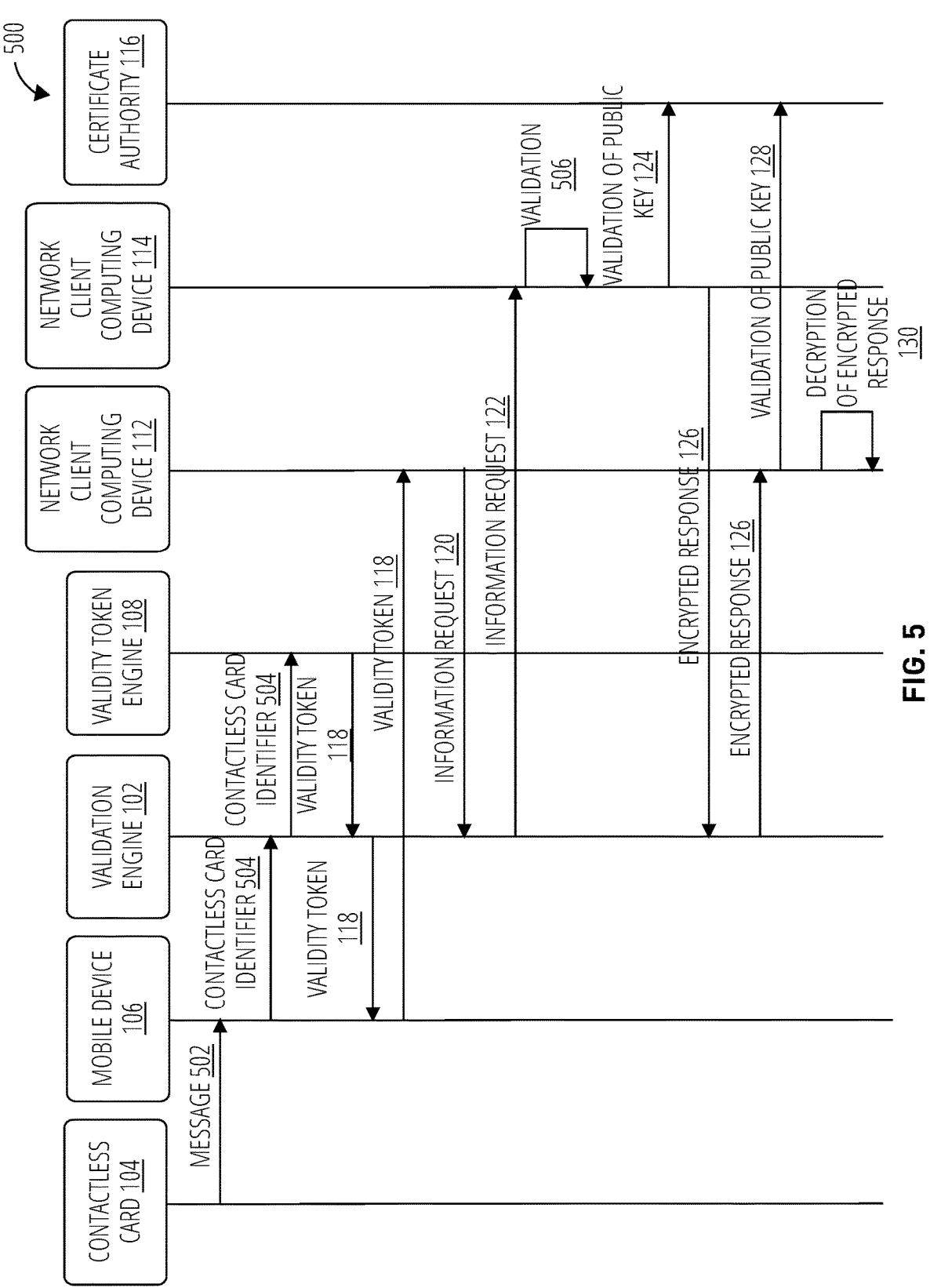
FIG. 5 illustrates an example of a process that may be performed in connection with execution of a transaction, according to some implementations of the current subject matter.

FIG. 5 illustrates an example of a process 500 that may be performed in connection with execution of a transaction, according to some implementations of the current subject matter. The process 500 may be performed by one or more components of the system 100, such as, for example, the contactless card 104, the mobile device 106, the validation engine 102, the validity token engine 108, the computing device 112, the computing device 114, and the certificate authority 116. As can be understood, one or more of the above components may be optional and/or not involved in the process 500.

The process 500 may be initiated by the contactless card 104 being detected within a predetermined boundary of the mobile device 106, triggering execution of an NFC exchange between the contactless card 104 and the mobile device 106. Alternatively, or in addition, the contactless card 104 may be tapped on the mobile device 106, which may also trigger execution of the NFC exchange.

Upon being within the boundary of and/or being tapped on the mobile device 106, the contactless card 104 may be configured to transmit a message 502 to the mobile device 106. The message 502 may include a contactless card identifier (e.g., a contactless card identifier 202 as shown in FIG. 2), a cryptogram (e.g., generated by and/or stored on the contactless card 104), etc. along with any other information that may be needed for the NFC exchange and/or any other communication between the contactless card 104 and the mobile device 106. In turn, the mobile device 106 may transmit the received data to the validation engine 102 as contactless card identifier 504. As can be understood, the message 502 may be any type of information, data, etc. that may be sent from the contactless card 104 to the mobile device 202. Alternatively, or in addition, the message 502 may be sent from the mobile device 202 to the validation engine 102 without receiving any message 502 from the contactless card 104. For instance, the process 500 may be initiated by the mobile device 202 without use of the contactless card 104, where contactless card data may be stored on the mobile device 202 and sent to the validation engine 102.

The validation engine 102 may use the contactless card identifier 504 (which may have the same content, e.g., a cryptogram, etc., as the message 502) to determine the issuer of the contactless card and, upon determining the issuer, transmit the contactless card identifier 504 to the validity token engine 108. As discussed above, the validity token engine 108 may include an application programming interface (e.g., API 110), which may receive the contactless card identifier 504 and process it. The validity token engine 108 may then use the contactless card identifier 504 to generate the validity token 118. The validity token engine 108 may package fields of the validity token 118 with information related to the issuer of the contactless card, information related to the merchant with whom the transaction involving the contactless card 104 is to be executed, and/or any other information.

The validity token engine 108 may transmit the validity token 118 to the validation engine 108, which, in turn, may transmit to the mobile device 106, which may provide it to the computing device 112, which may be associated with one or more computing servers and/or other devices of the merchant's backend network. Alternatively, or in addition, the validity token engine 108 may transmit the validity token 118 directly to the computing device 112.

Upon receipt of the validity token 118, the computing device 112 may, optionally, validate information about the issuer as contained in the validity token 118. For example, data (e.g., name of the issuer, identifier of the issuer, etc.) may be checked for validity. The computing device 112 may then generate information request 120, which may include a request to the issuer (e.g., computing device 114) to provide cardholder data associated with the contactless card 104, the validity token 118, and the merchant's public key (e.g., public key 304). The computing device 112 may transmit the generated information request 120 to the validation engine 102.

The validation engine 102 may process the received information request 120 to determine information associated with the issuer of the contactless card 104 (e.g., name of the issuer, identifier of the issuer, etc.). Once determined, the validation engine 102 may send the information request to the computing device 114. For example, the validation engine may determine a destination address associated with the computing device 114 (e.g., a server associated with the issuer), and use the address to transmit the information request 122.

The computing device 114, upon receipt of the information request 122, may be configured to execute one or more validation procedures. For example, the computing device 114 may perform validation procedure 506. During validation procedure 506, the computing device 114 may retrieve validity token 118 from the received information request. The computing device 114 may then extract information associated with the merchant from the validity token 118. By way of a non-limiting example, the computing device 114 may extract merchant's name, identifier, etc. from the validity token 118. The computing device 114 may also extract information from the public key that it received as part of the information request. Since the received public key is merchant's public key, it may include information about the merchant as well. The computing device 114 may extract merchant's information from the merchant's public key and compare it to the merchant's information extracted from the validity token 118. If a match is determined, the computing device 114 may then communicate with the certificate authority 116 to perform validation of the merchant's public key, at 124.

The certificate authority 116 may check whether the merchant's public key is valid. If the public key is not valid, the certificate authority 116 may inform the computing device 114 that the public is not valid. In some implementations, the certificate authority 116 may inform the computing device may inform the computing device 114 that the public key may have expired but that all other credentials associated with the public key are valid and the public key may still be used. As can be understood, the certificate authority 116 may provide any other information to the computing device 114 concerning the public key.

Once the validation procedures are completed, the computing device 114 may retrieve cardholder information (e.g., from database 406) and generate, using a shared key, an encrypted response 126 for transmission to the computing device 112 in response to its information request. The computing device 114 may transmit the encrypted response 126 to the validation engine 102 and/or directly to the computing device 112.

Upon receipt of the encrypted response 126, the computing device 112 may communicate with the certificate authority 116 to perform validation of the issuer's public key included in the encrypted response 126, at 128. The certificate authority 116 may perform similar validation procedures as with the merchant's public key during validation of public key procedure, at 124.

If the issuer's public key is valid and/or otherwise can be used, the computing device 112 may generate a shared key based on the issuer's public key. The computing device 112 may then use the generated shared key to perform decryption of the encrypted response 126, at 130. Once cardholder information has been decrypted, the computing device 112 may execute the transaction.

FIG. 6 illustrates an example of a process 600 that may be performed in connection with execution of a transaction, according to some implementations of the current subject matter. One or more components of the system 100 (as shown in FIG. 1) may execute one or more operations associated with the process 600.

At 602, one or more processors of the validation engine 102 may be configured to trigger generation of a validity token based on a contactless card identifier associated with a contactless card (e.g., contactless card 104) that may be received from a mobile device (e.g., mobile device 105). The validity token (e.g., validity token 118) may be generated upon validating the contactless card using the contactless card identifier. For example, the validity token may be generated using the validity token engine 108. The validation engine 102, upon receipt of the validity token, may be configured to transmit it to a first computing device (e.g., computing device 112, which may be associated with a merchant) communicatively coupled with the validation engine 102.

The contactless card identifier may be transmitted to the validation engine 102 as a result of a near-field communication (NFC) exchange between the contactless card and the mobile device, where the contactless card may be detected by the mobile device to be located within a predetermined distance of the mobile device. In some example implementations, the contactless card identifier may include a contactless card number and/or any other identifier of the contactless card.

At 604, the validation engine 102 may be configured to identify a second computing device (e.g., computing device 114) in a plurality of second computing devices (e.g., multiple computing devices 114, each of which may be associated with different contactless card issuers). A specific second computing device may be identified based on an information request received from the first computing device. The information request (e.g., information request 120) may include a first public key (e.g., public key 304 as shown in FIG. 3) associated with the first computing device and the validity token. The information request may seek cardholder information associated with the contactless card.

At 606, the validation engine 102 may send an encrypted response (e.g., encrypted response 126) to the information request and a second public key (e.g., public key 410 as shown in FIG. 4) associated with the identified second computing device to the first computing device. The encrypted response may be generated by the identified second computing device and encrypted using a shared key (e.g., as generated by the shared key generator 408). The shared key may be generated using the first public key (e.g., public key 304) associated with the first computing device.

At 608, the validation engine 102 may cause the first computing device to decrypt the encrypted response to the information request. The first computing device may perform the decryption upon generation of the shared key using the second public key (e.g., public key 410) associated with the identified second computing device.

FIG. 7 illustrates another example of a process 700 that may be performed in connection with execution of a transaction, according to some implementations of the current subject matter. The process 700 may be executed using one or more components of the system 100 shown in FIG. 1. At 702, a validity token (e.g., validity token 118) generated using a contactless card identifier associated with a contactless card may be received.

At 704, the validity token may be transmitted to a first computing device (e.g., computing device 112). A second computing device (e.g., computing device 114) in a plurality of second computing devices may be identified based on an information request received from the first computing device, at 706. The information request may include a first public key (e.g., public key 304) associated with the first computing device and the validity token (e.g., validity token 118). The information request may seek information associated with the contactless card. The identified second computing device may be configured to generate an encrypted response (e.g., encrypted response 126) to the information request (e.g., information request 1220.

At 708, the first computing device may be configured to decrypt the encrypted response to the information request upon generation of a shared key using a second public key (e.g., public key 410) associated with the identified second computing device.

FIG. 8 illustrates yet another example of a process 800 that may be performed in connection with execution of a transaction, according to some implementations of the current subject matter. At 802, a mobile device may transmit a contactless card identifier associated with a contactless card based on execution of a near-field communication (NFC) exchange between the contactless card (e.g., contactless card 104) and the mobile device (e.g., mobile device 106) upon the contactless card being detected by the mobile device to be located within a predetermined distance of the mobile device. The contactless card identifier may be received by the validation engine 102.

A validity token may be transmitted to a first computing device, at 804. The validity token may be generated based on the received contactless card identifier. The token may be generated upon validating the contactless card using the contactless card identifier.

At 806, a second computing device in a plurality of second computing devices may be identified based on an information request received from the first computing device. The information request may include a first public key (e.g., public key 304) associated with the first computing device and the validity token (e.g., validity token 118). The request may be associated with the contactless card.

At 808, an encrypted response to the information request may be sent along with a second public key (e.g., public key 410) associated with the identified second computing device to the first computing device. The encrypted response may be generated by the identified second computing device and encrypted using a shared key generated using the first public key associated with the first computing device. Transmission of the encrypted response to the identified second computing device may include sending the encrypted response to the identified second computing device without decrypting the encrypted response (e.g., by the validation engine 102).

At 810, the first computing device may be prompted or triggered to decrypt the encrypted response to the information request upon generation of the shared key using the second public key associated with the identified second computing device.

FIG. 9 illustrates a data transmission system 900 according to an example embodiment. As further discussed below, system 900 may include contactless card 902, client device 904, network 906, and server 908. Although FIG. 9 illustrates single instances of the components, system 900 may include any number of components.

System 900 may include one or more contactless cards 902, which are further explained below. In some embodiments, contactless card 902 may be in wireless communication, utilizing NFC in an example, with client device 904.

System 900 may include client device 904, which may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a thin client, a fat client, an Internet browser, or other device. The client device 904 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 904 device can include a processor and a memory, and it is understood that the processing circuitry may contain additional components, including processors, memories, error and parity/CRC checkers, data encoders, anticollision algorithms, controllers, command decoders, security primitives and tamperproofing hardware, as necessary to perform the functions described herein. The client device 904 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some examples, client device 904 of system 900 may execute one or more applications, such as software applications, that enable, for example, network communications with one or more components of system 900 and transmit and/or receive data.

The client device 904 may be in communication with one or more server(s) 908 via one or more network(s) 906, and may operate as a respective front-end to back-end pair with server 908. The client device 904 may transmit, for example from a mobile device application executing on client device 904, one or more requests to server 908. The one or more requests may be associated with retrieving data from server 908. The server 908 may receive the one or more requests from client device 904. Based on the one or more requests from client device 904, server 908 may be configured to retrieve the requested data from one or more databases (not shown). Based on receipt of the requested data from the one or more databases, server 908 may be configured to transmit the received data to client device 904, the received data being responsive to one or more requests.

System 900 may include one or more networks 906. In some examples, network 906 may be one or more of a wireless network, a wired network or any combination of wireless network and wired network, and may be configured to connect client device 904 to server 908. For example, network 906 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1602.11 family of networking, Bluetooth, NFC, Radio Frequency Identification (RFID), Wi-Fi, and/or the like.

In addition, network 906 may include, without limitation, telephone lines, fiber optics, IEEE Ethernet 802.3, a wide area network, a wireless personal area network, a LAN, or a global network such as the Internet. In addition, network 906 may support an Internet network, a wireless communication network, a cellular network, or the like, or any combination thereof. network 906 may further include one network, or any number of the exemplary types of networks mentioned above, operating as a stand-alone network or in cooperation with each other. network 906 may utilize one or more protocols of one or more network elements to which they are communicatively coupled. network 906 may translate to or from other protocols to one or more protocols of network devices. Although network 906 is depicted as a single network, it should be appreciated that according to one or more examples, network 906 may comprise a plurality of interconnected networks, such as, for example, the Internet, a service provider's network, a cable television network, corporate networks, such as credit card association networks, and home networks.

System 900 may include one or more servers 908. In some examples, server 908 may include one or more processors, which are coupled to memory. The server 908 may be configured as a central system, server or platform to control and call various data at different times to execute a plurality of workflow actions. Server 120 may be configured to connect to the one or more databases. The server 908 may be connected to at least one client device 904.

Figure 10:
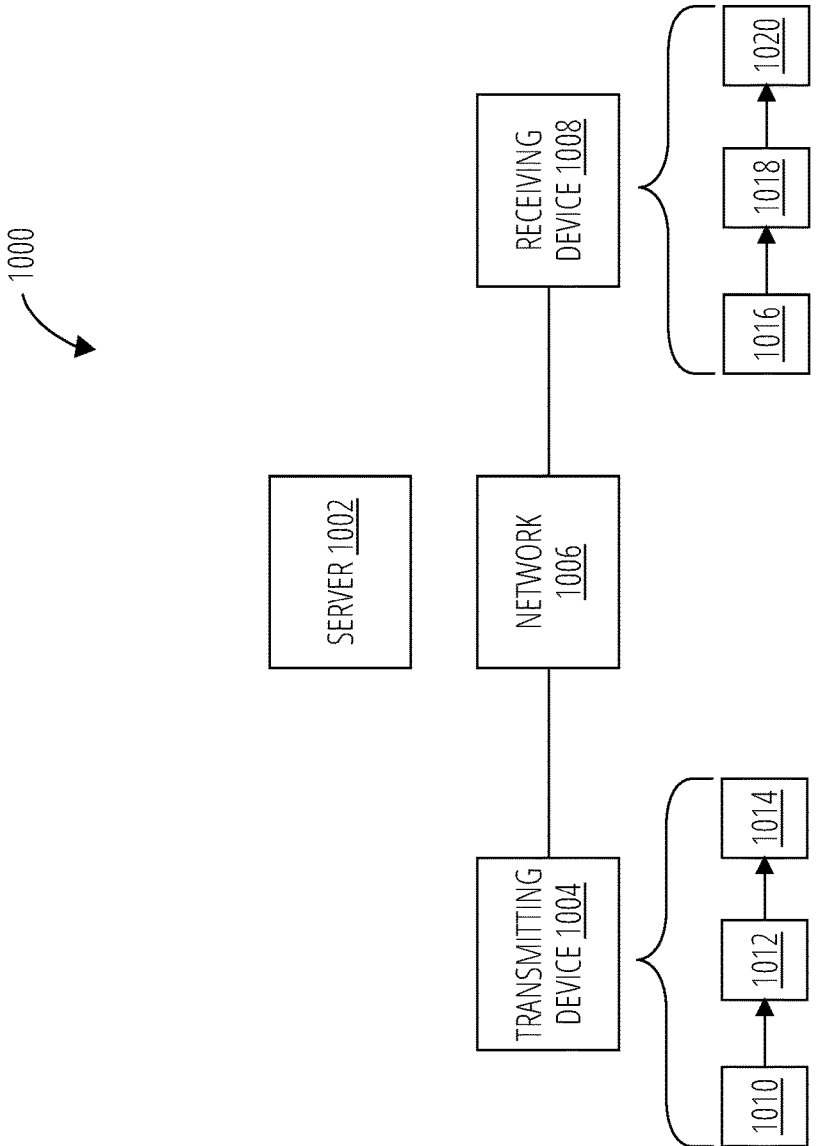
FIG. 10 illustrates an aspect of the subject matter in accordance with one embodiment.

FIG. 10 illustrates a data transmission system according to an example embodiment. System 1000 may include a transmitting or transmitting device 1004, a receiving or receiving device 1008 in communication, for example via network 1006, with one or more servers 1002. Transmitting or transmitting device 1004 may be the same as, or similar to, one or more of the devices 102-114 discussed above with reference to FIG. 1. Receiving or receiving device 1008 may be the same as, or similar to, one or more of the devices 102-114 discussed above with reference to FIG. 1. Network 1006 may be similar to networks discussed above with reference to FIG. 1. Server 1002 may be similar to one or more of the devices 102-114 discussed above with reference to FIG. 1. Although FIG. 10 shows single instances of components of system 1000, system 1000 may include any number of the illustrated components.

When using symmetric cryptographic algorithms, such as encryption algorithms, hash-based message authentication code (HMAC) algorithms, and cipher-based message authentication code (CMAC) algorithms, it is important that the key remain secret between the party that originally processes the data that is protected using a symmetric algorithm and the key, and the party who receives and processes the data using the same cryptographic algorithm and the same key.

It is also important that the same key is not used too many times. If a key is used or reused too frequently, that key may be compromised. Each time the key is used, it provides an attacker an additional sample of data which was processed by the cryptographic algorithm using the same key. The more data which the attacker has which was processed with the same key, the greater the likelihood that the attacker may discover the value of the key. A key used frequently may be comprised in a variety of different attacks.

Moreover, each time a symmetric cryptographic algorithm is executed, it may reveal information, such as side-channel data, about the key used during the symmetric cryptographic operation. Side-channel data may include minute power fluctuations which occur as the cryptographic algorithm executes while using the key. Sufficient measurements may be taken of the side-channel data to reveal enough information about the key to allow it to be recovered by the attacker. Using the same key for exchanging data would repeatedly reveal data processed by the same key.

However, by limiting the number of times a particular key will be used, the amount of side-channel data which the attacker is able to gather is limited and thereby reduce exposure to this and other types of attack. As further described herein, the parties involved in the exchange of cryptographic information (e.g., sender and recipient) can independently generate keys from an initial shared master symmetric key in combination with a counter value, and thereby periodically replace the shared symmetric key being used with needing to resort to any form of key exchange to keep the parties in sync. By periodically changing the shared secret symmetric key used by the sender and the recipient, the attacks described above are rendered impossible.

Referring back to FIG. 10, system 1000 may be configured to implement key diversification. For example, a sender and recipient may desire to exchange data (e.g., original sensitive data) via respective devices 1004 and 1008. As explained above, although single instances of transmitting device 1004 and receiving device 1008 may be included, it is understood that one or more transmitting devices 1004 and one or more receiving devices 1008 may be involved so long as each party shares the same shared secret symmetric key. In some examples, the transmitting device 1004 and receiving device 1008 may be provisioned with the same master symmetric key. Further, it is understood that any party or device holding the same secret symmetric key may perform the functions of the transmitting device 1004 and similarly any party holding the same secret symmetric key may perform the functions of the receiving device 1008. In some examples, the symmetric key may comprise the shared secret symmetric key which is kept secret from all parties other than the transmitting device 1004 and the receiving device 1008 involved in exchanging the secure data. It is further understood that both the transmitting device 1004 and receiving device 1008 may be provided with the same master symmetric key, and further that part of the data exchanged between the transmitting device 1004 and receiving device 1008 comprises at least a portion of data which may be referred to as the counter value. The counter value may comprise a number that changes each time data is exchanged between the transmitting device 1004 and the receiving device 1008.

System 1000 may include one or more networks 1006. In some examples, network 1006 may be one or more of a wireless network, a wired network or any combination of wireless network and wired network, and may be configured to connect one or more transmitting devices 1004 and one or more receiving devices 1008 to server 1002. For example, network 1006 may include one or more of a fiber optics network, a passive optical network, a cable network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 1602.11 family network, Bluetooth, NFC, RFID, Wi-Fi, and/or the like.

In addition, network 1006 may include, without limitation, telephone lines, fiber optics, IEEE Ethernet 1702.3, a wide area network, a wireless personal area network, a LAN, or a global network such as the Internet. In addition, network 1006 may support an Internet network, a wireless communication network, a cellular network, or the like, or any combination thereof. Network 1006 may further include one network, or any number of the exemplary types of networks mentioned above, operating as a stand-alone network or in cooperation with each other. Network 1006 may utilize one or more protocols of one or more network elements to which they are communicatively coupled. Network 1006 may translate to or from other protocols to one or more protocols of network devices. Although network 1006 is depicted as a single network, it should be appreciated that according to one or more examples, network 1006 may comprise a plurality of interconnected networks, such as, for example, the Internet, a service provider's network, a cable television network, corporate networks, such as credit card association networks, and home networks.

In some examples, one or more transmitting devices 1004 and one or more receiving devices 1008 may be configured to communicate and transmit and receive data between each other without passing through network 1006. For example, communication between the one or more transmitting devices 1004 and the one or more receiving devices 1008 may occur via at least one of NFC, Bluetooth, RFID, Wi-Fi, and/or the like.

At 1010, when the transmitting device 1004 is preparing to process the sensitive data with symmetric cryptographic operation, the sender may update a counter. In addition, the transmitting device 1004 may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128; a symmetric HMAC algorithm, such as HMAC-SHA-256; and a symmetric CMAC algorithm such as AES-CMAC. It is understood that if the output of the selected symmetric algorithm does not generate a sufficiently long key, techniques such as processing multiple iterations of the symmetric algorithm with different input data and the same master key may produce multiple outputs which may be combined as needed to produce sufficient length keys.

At 1012, the transmitting device 1004 may take the selected cryptographic algorithm, and using the master symmetric key, process the counter value. For example, the sender may select a symmetric encryption algorithm, and use a counter which updates with every conversation between the transmitting device 1004 and the receiving device 1008. The transmitting device 1004 may then encrypt the counter value with the selected symmetric encryption algorithm using the master symmetric key, creating a diversified symmetric key.

In some examples, the counter value may not be encrypted. In these examples, the counter value may be transmitted between the transmitting device 1004 and the receiving device 1008 at 1012 without encryption.

At 1014, the diversified symmetric key may be used to process the sensitive data before transmitting the result to the receiving device 1008. For example, the transmitting device 1004 may encrypt the sensitive data using a symmetric encryption algorithm using the diversified symmetric key, with the output comprising the protected encrypted data. The transmitting device 1004 may then transmit the protected encrypted data, along with the counter value, to the receiving device 1008 for processing.

At 1016, the receiving device 1008 may first take the counter value and then perform the same symmetric encryption using the counter value as input to the encryption, and the master symmetric key as the key for the encryption. The output of the encryption may be the same diversified symmetric key value that was created by the sender.

At 1018, the receiving device 1008 may then take the protected encrypted data and using a symmetric decryption algorithm along with the diversified symmetric key, decrypt the protected encrypted data.

At 1020, as a result of the decrypting the protected encrypted data, the original sensitive data may be revealed.

The next time sensitive data needs to be sent from the sender to the recipient via respective transmitting device 1004 and receiving device 1008, a different counter value may be selected producing a different diversified symmetric key. By processing the counter value with the master symmetric key and same symmetric cryptographic algorithm, both the transmitting device 1004 and receiving device 1008 may independently produce the same diversified symmetric key. This diversified symmetric key, not the master symmetric key, is used to protect the sensitive data.

As explained above, both the transmitting device 1004 and receiving device 1008 each initially possess the shared master symmetric key. The shared master symmetric key is not used to encrypt the original sensitive data. Because the diversified symmetric key is independently created by both the transmitting device 1004 and receiving device 1008, it is never transmitted between the two parties. Thus, an attacker cannot intercept the diversified symmetric key and the attacker never sees any data which was processed with the master symmetric key. Only the counter value is processed with the master symmetric key, not the sensitive data. As a result, reduced side-channel data about the master symmetric key is revealed. Moreover, the operation of the transmitting device 1004 and the receiving device 1008 may be governed by symmetric requirements for how often to create a new diversification value, and therefore a new diversified symmetric key. In an embodiment, a new diversification value and therefore a new diversified symmetric key may be created for every exchange between the transmitting device 1004 and receiving device 1008.

In some examples, the key diversification value may comprise the counter value. Other non-limiting examples of the key diversification value include: a random nonce generated each time a new diversified key is needed, the random nonce sent from the transmitting device 1004 to the receiving device 1008; the full value of a counter value sent from the transmitting device 1004 and the receiving device 1008; a portion of a counter value sent from the transmitting device 1004 and the receiving device 1008; a counter independently maintained by the transmitting device 1004 and the receiving device 1008 but not sent between the two devices; a one-time-passcode exchanged between the transmitting device 1004 and the receiving device 1008; and a cryptographic hash of the sensitive data. In some examples, one or more portions of the key diversification value may be used by the parties to create multiple diversified keys. For example, a counter may be used as the key diversification value. Further, a combination of one or more of the exemplary key diversification values described above may be used.

In another example, a portion of the counter may be used as the key diversification value. If multiple master key values are shared between the parties, the multiple diversified key values may be obtained by the systems and processes described herein. A new diversification value, and therefore a new diversified symmetric key, may be created as often as needed. In the most secure case, a new diversification value may be created for each exchange of sensitive data between the transmitting device 1004 and the receiving device 1008. In effect, this may create a one-time use key, such as a single-use session key.

Figure 11:
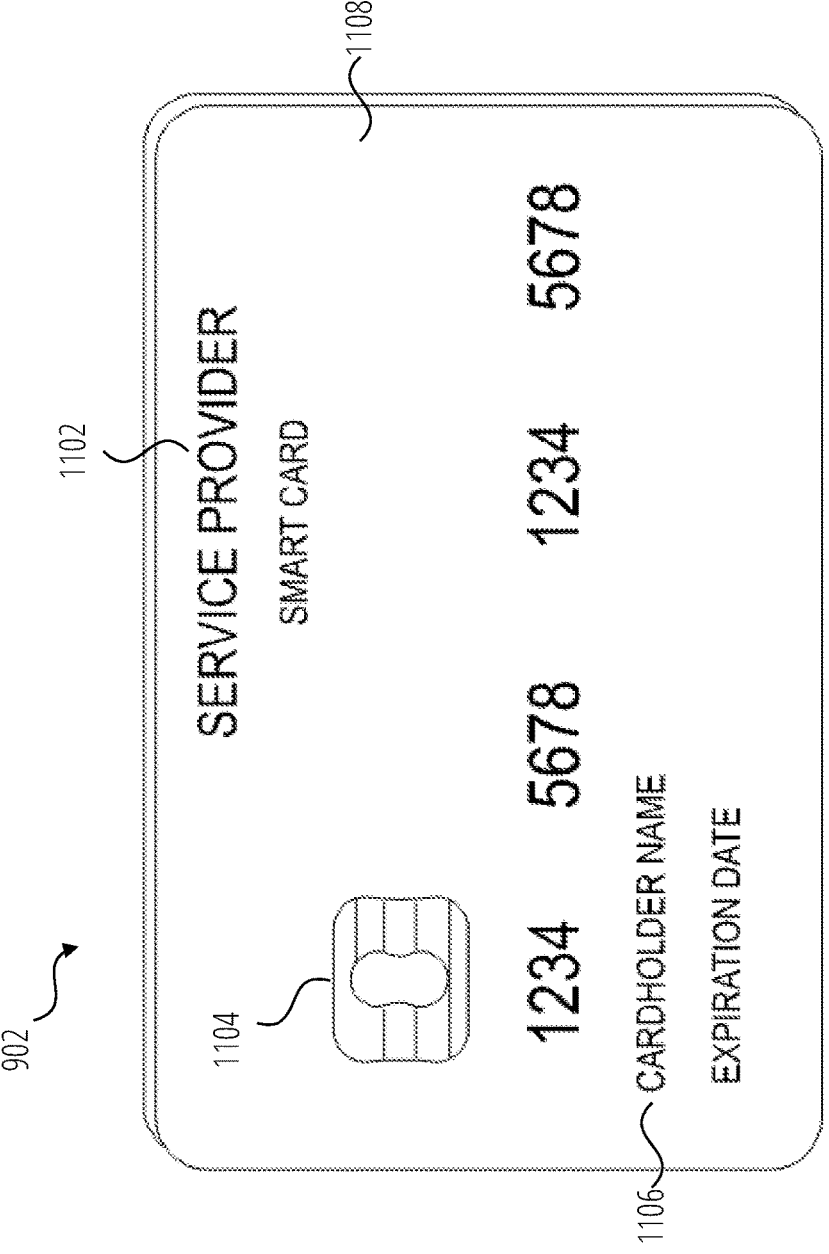
FIG. 11 illustrates a contactless card in accordance with one embodiment.

FIG. 11 illustrates an example configuration of a contactless card 902, which may include a contactless card, a payment card, such as a credit card, debit card, or gift card, issued by a service provider as displayed as service provider indicia 1102 on the front or back of the contactless card 902. In some examples, the contactless card 902 is not related to a payment card, and may include, without limitation, an identification card. In some examples, the transaction card may include a dual interface contactless payment card, a rewards card, and so forth. The contactless card 902 may include a substrate 1108, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 902 may have physical characteristics compliant with the ID-1 format of the ISO/IEC 7816 standard, and the transaction card may otherwise be compliant with the ISO/IEC 14443 standard. However, it is understood that the contactless card 902 according to the present disclosure may have different characteristics, and the present disclosure does not require a transaction card to be implemented in a payment card.

The contactless card 902 may also include identification information 1106 displayed on the front and/or back of the card, and a contact pad 1104. The contact pad 1104 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 902 may also include processing circuitry, antenna and other components as will be further discussed in FIG. 12. These components may be located behind the contact pad 1104 or elsewhere on the substrate 1108, e.g., within a different layer of the substrate 1108, and may electrically and physically coupled with the contact pad 1104. The contactless card 902 may also include a magnetic strip or tape, which may be located on the back of the card (not shown in FIG. 11). The contactless card 902 may also include a Near-Field Communication (NFC) device coupled with an antenna capable of communicating via the NFC protocol. Embodiments are not limited in this manner.

Figure 12:
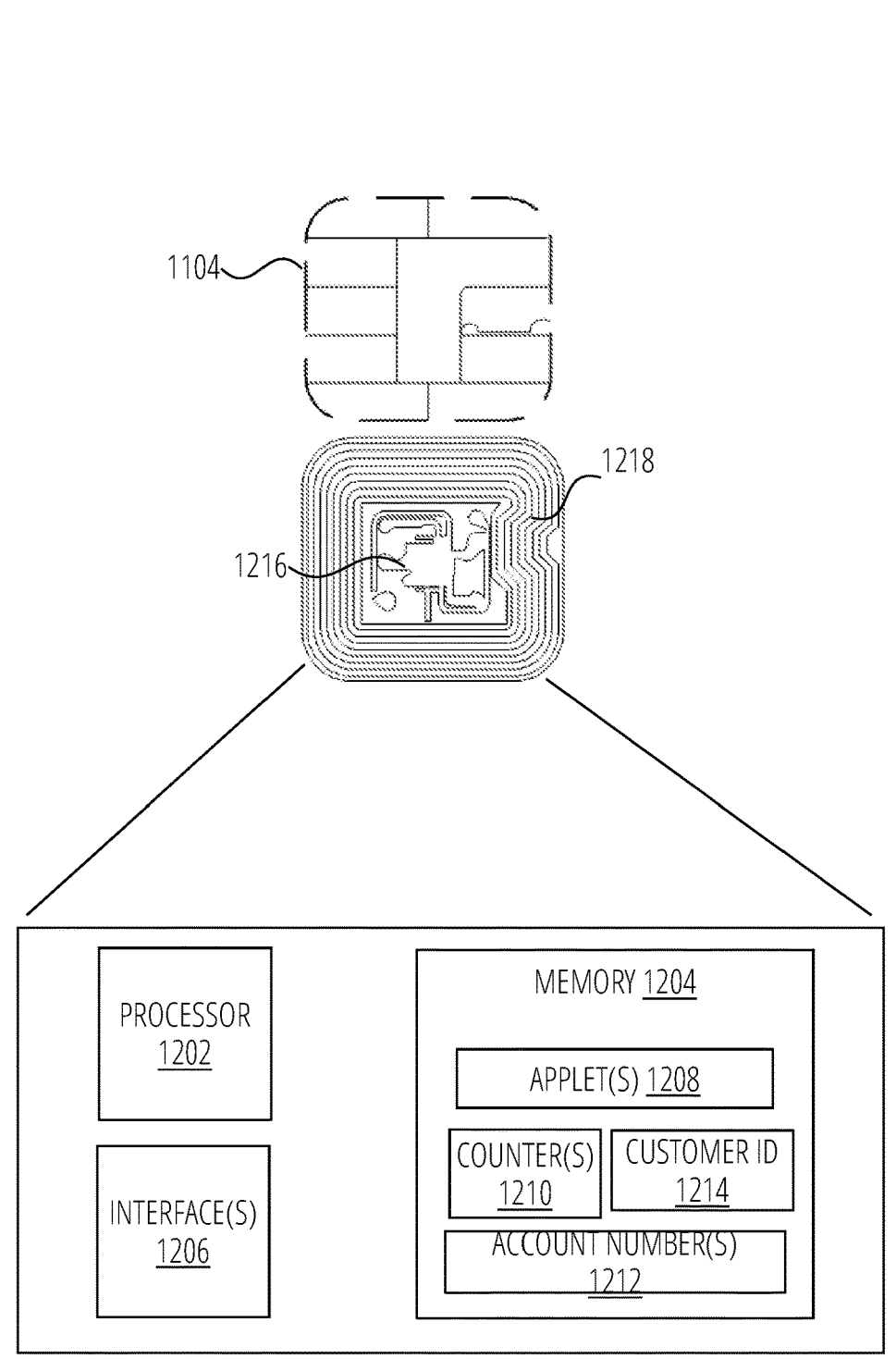
FIG. 12 illustrates a transaction card component in accordance with one embodiment.

As illustrated in FIG. 12, the contact pad 1104 of contactless card 902 may include processing circuitry 1216 for storing, processing, and communicating information, including a processor 1202, a memory 1204, and one or more interface(s) 1206. It is understood that the processing circuitry 1216 may contain additional components, including processors, memories, error and parity/CRC checkers, data encoders, anticollision algorithms, controllers, command decoders, security primitives and tamperproofing hardware, as necessary to perform the functions described herein.

The memory 1204 may be a read-only memory, write-once read-multiple memory or read/write memory, e.g., RAM, ROM, and EEPROM, and the contactless card 902 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 1204 may be encrypted memory utilizing an encryption algorithm executed by the processor 1202 to encrypted data.

The memory 1204 may be configured to store one or more applet(s) 1208, one or more counter(s) 1210, a customer identifier 1214, and the account number(s) 1212, which may be virtual account numbers. The one or more applet(s) 1208 may comprise one or more software applications configured to execute on one or more contactless cards, such as a Java® Card applet. However, it is understood that applet(s) 1208 are not limited to Java Card applets, and instead may be any software application operable on contactless cards or other devices having limited memory. The one or more counter(s) 1210 may comprise a numeric counter sufficient to store an integer. The customer identifier 1214 may comprise a unique alphanumeric identifier assigned to a user of the contactless card 902, and the identifier may distinguish the user of the contactless card from other contactless card users. In some examples, the customer identifier 1214 may identify both a customer and an account assigned to that customer and may further identify the contactless card 902 associated with the customer's account. As stated, the account number(s) 1212 may include thousands of one-time use virtual account numbers associated with the contactless card 902. An applet(s) 1208 of the contactless card 902 may be configured to manage the account number(s) 1212 (e.g., to select an account number(s) 1212, mark the selected account number(s) 1212 as used, and transmit the account number(s) 1212 to a mobile device for autofilling by an autofilling service.

The processor 1202 and memory elements of the forego-ing exemplary embodiments are described with reference to the contact pad 1104, but the present disclosure is not limited thereto. It is understood that these elements may be imple-mented outside of the contact pad 1104 or entirely separate from it, or as further elements in addition to processor 1202 and memory 1204 elements located within the contact pad 1104.

In some examples, the contactless card 902 may comprise one or more antenna(s) 1218. The one or more antenna(s) 1218 may be placed within the contactless card 902 and around the processing circuitry 1216 of the contact pad 1104. For example, the one or more antenna(s) 1218 may be integral with the processing circuitry 1216 and the one or more antenna(s) 1218 may be used with an external booster coil. As another example, the one or more antenna(s) 1218 may be external to the contact pad 1104 and the processing circuitry 1216.

In an embodiment, the coil of contactless card 902 may act as the secondary of an air core transformer. The terminal may communicate with the contactless card 902 by cutting power or amplitude modulation. The contactless card 802 may infer the data transmitted from the terminal using the gaps in the contactless card's power connection, which may be functionally maintained through one or more capacitors. The contactless card 902 may communicate back by switch-ing a load on the contactless card's coil or load modulation. Load modulation may be detected in the terminal's coil through interference. More generally, using the antenna(s) 1218, processor 1202, and/or the memory 1204, the con-tactless card 802 provides a communications interface to communicate via NFC, Bluetooth, and/or Wi-Fi communi-cations.

As explained above, contactless card 902 may be built on a software platform operable on smart cards or other devices having limited memory, such as JavaCard, and one or more or more applications or applets may be securely executed. Applet(s) 1208 may be added to contactless cards to provide a one-time password (OTP) for multifactor authentication (MFA) in various mobile application-based use cases. App-let(s) 1208 may be configured to respond to one or more requests, such as near field data exchange requests, from a reader, such as a mobile NFC reader (e.g., of a mobile device or point-of-sale terminal), and produce an NDEF message that comprises a cryptographically secure OTP encoded as an NDEF text tag.

One example of an NDEF OTP is an NDEF short-record layout (SR=1). In such an example, one or more applet(s) 1208 may be configured to encode the OTP as an NDEF type 4 well known type text tag. In some examples, NDEF messages may comprise one or more records. The applet(s) 1208 may be configured to add one or more static tag records in addition to the OTP record.

In some examples, the one or more applet(s) 1208 may be configured to emulate an RFID tag. The RFID tag may include one or more polymorphic tags. In some examples, each time the tag is read, different cryptographic data is presented that may indicate the authenticity of the contact-less card. Based on the one or more applet(s) 1208, an NFC read of the tag may be processed, the data may be trans-mitted to a server, such as a server of a banking system, and the data may be validated at the server.

In some examples, the contactless card 902 and server may include certain data such that the card may be properly identified. The contactless card 902 may include one or more unique identifiers (not pictured). Each time a read operation takes place, the counter(s) 1210 may be configured to increment. In some examples, each time data from the contactless card 902 is read (e.g., by a mobile device), the counter(s) 1210 is transmitted to the server for validation and determines whether the counter(s) 1210 are equal (as part of the validation) to a counter of the server.

The one or more counter(s) 1210 may be configured to prevent a replay attack. For example, if a cryptogram has been obtained and replayed, that cryptogram is immediately rejected if the counter(s) 1210 has been read or used or otherwise passed over. If the counter(s) 1210 has not been used, it may be replayed. In some examples, the counter that is incremented on the card is different from the counter that is incremented for transactions. The contactless card 802 is unable to determine the application transaction counter(s) 1210 since there is no communication between applet(s) 1208 on the contactless card 902.

In some examples, the counter(s) 1210 may get out of sync. In some examples, to account for accidental reads that initiate transactions, such as reading at an angle, the counter(s) 1210 may increment but the application does not process the counter(s) 1210. In some examples, when the mobile device 106 is woken up, NFC may be enabled and the device 106 may be configured to read available tags, but no action is taken responsive to the reads.

To keep the counter(s) 1210 in sync, an application, such as a background application, may be executed that would be configured to detect when the mobile device 104 wakes up and synchronize with the server of a banking system indi-cating that a read that occurred due to detection to then move the counter 1200 forward. In other examples, Hashed One Time Password may be utilized such that a window of mis-synchronization may be accepted. For example, if within a threshold of 10, the counter(s) 1210 may be configured to move forward. But if within a different thresh-old number, for example within 10 or 1000, a request for performing re-synchronization may be processed which requests via one or more applications that the user tap, gesture, or otherwise indicate one or more times via the user's device. If the counter(s) 1210 increases in the appro-priate sequence, then it possible to know that the user has done so.

The key diversification technique described herein with reference to the counter(s) 1210, master key, and diversified key, is one example of encryption and/or decryption a key diversification technique. This example key diversification technique should not be considered limiting of the disclo-sure, as the disclosure is equally applicable to other types of key diversification techniques.

During the creation process of the contactless card 902, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 902. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversi-fication data. For example, each time the contactless card 902 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 13:
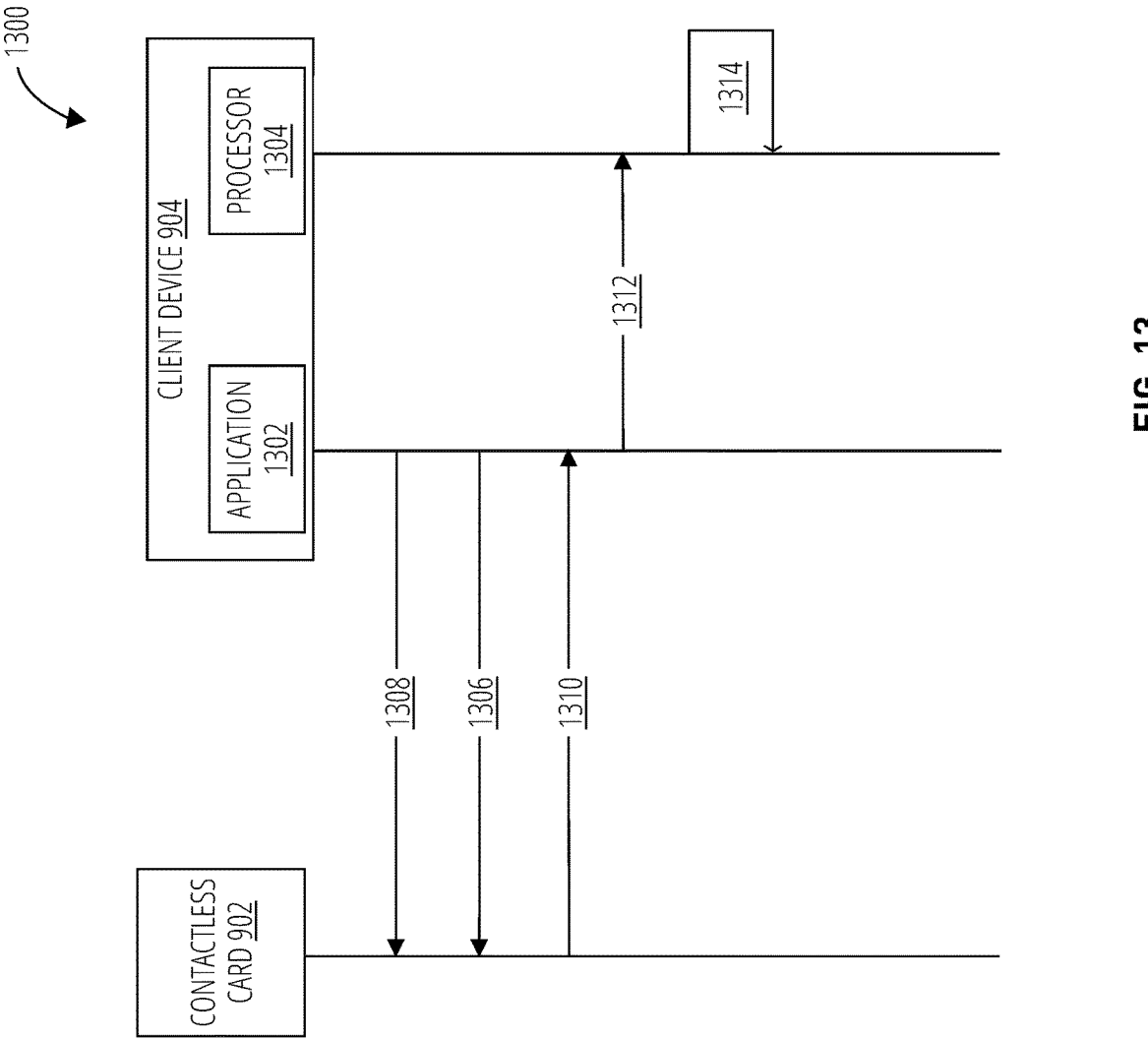
FIG. 13 illustrates a sequence flow in accordance with one embodiment.

FIG. 13 is a timing diagram illustrating an example sequence for providing authenticated access according to one or more embodiments of the present disclosure. Sequence flow 1300 may include contactless card 902 and client device 904, which may include an application 1302 and processor 1304.

At line 1308, the application 1302 communicates with the contactless card 902 (e.g., after being brought near the contactless card 902). Communication between the application 1302 and the contactless card 902 may involve the contactless card 902 being sufficiently close to a card reader (not shown) of the client device 904 to enable NFC data transfer between the application 1302 and the contactless card 902.

At line 1306, after communication has been established between client device 904 and contactless card 902, contactless card 902 generates a message authentication code (MAC) cryptogram. In some examples, this may occur when the contactless card 902 is read by the application 1302. In particular, this may occur upon a read, such as an NFC read, of a near field data exchange (NDEF) tag, which may be created in accordance with the NFC Data Exchange Format. For example, a reader application, such as application 1302, may transmit a message, such as an applet select message, with the applet ID of an NDEF producing applet. Upon confirmation of the selection, a sequence of select file messages followed by read file messages may be transmitted. For example, the sequence may include "Select Capabilities file", "Read Capabilities file", and "Select NDEF file". At this point, a counter value maintained by the contactless card 902 may be updated or incremented, which may be followed by "Read NDEF file." At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (responsive to the "Read NDEF file" message).

In some examples, the MAC cryptogram may be transmitted as an NDEF tag, and in other examples the MAC cryptogram may be included with a uniform resource indicator (e.g., as a formatted string). In some examples, application 1302 may be configured to transmit a request to contactless card 902, the request comprising an instruction to generate a MAC cryptogram.

At line 1310, the contactless card 902 sends the MAC cryptogram to the application 1302. In some examples, the transmission of the MAC cryptogram occurs via NFC, however, the present disclosure is not limited thereto. In other examples, this communication may occur via Bluetooth, Wi-Fi, or other means of wireless data communication. At line 1312, the application 1302 communicates the MAC cryptogram to the processor 1304.

At line 1314, the processor 1304 verifies the MAC cryptogram pursuant to an instruction from the application 122. For example, the MAC cryptogram may be verified, as explained below. In some examples, verifying the MAC cryptogram may be performed by a device other than client device 904, such as a server of a banking system in data communication with the client device 904. For example, processor 1304 may output the MAC cryptogram for transmission to the server of the banking system, which may verify the MAC cryptogram. In some examples, the MAC cryptogram may function as a digital signature for purposes of verification. Other digital signature algorithms, such as public key asymmetric algorithms, e.g., the Digital Signature Algorithm and the RSA algorithm, or zero knowledge protocols, may be used to perform this verification.

Figure 14:
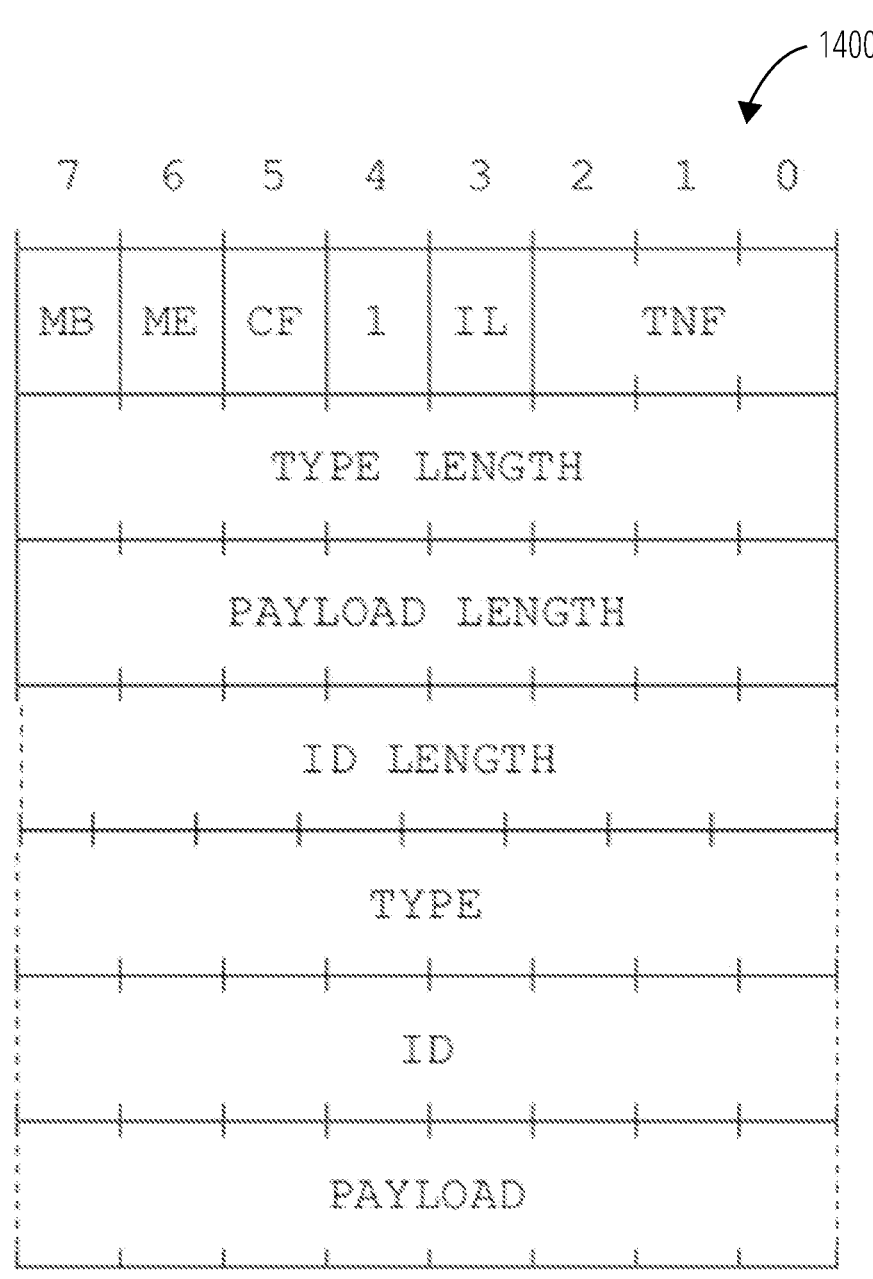
FIG. 14 illustrates a data structure in accordance with one embodiment.

FIG. 14 illustrates an NDEF short-record layout (SR=1) data structure 1400 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well-known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data.

FIG. 15 illustrates a diagram of a system 1500 configured to implement one or more embodiments of the present disclosure. As explained below, during the contactless card creation process, two cryptographic keys may be assigned uniquely for each card. The cryptographic keys may comprise symmetric keys which may be used in both encryption and decryption of data. Triple DES (3DES) algorithm may be used by EMV and it is implemented by hardware in the contactless card. By using a key diversification process, one or more keys may be derived from a master key based upon uniquely identifiable information for each entity that requires a key.

Regarding master key management, two issuer master keys 1502, 1526 may be required for each part of the portfolio on which the one or more applets is issued. For example, the first master key 1502 may comprise an Issuer Cryptogram Generation/Authentication Key (Iss-Key-Auth) and the second master key 1526 may comprise an Issuer Data Encryption Key (Iss-Key-DEK). As further explained herein, two issuer master keys 1502, 1526 are diversified into card master keys 1508, 1520, which are unique for each card. In some examples, a network profile record ID (pNPR) 522 and derivation key index (pDKI) 1524, as back office data, may be used to identify which Issuer Master Keys 1502, 1526 to use in the cryptographic processes for authentication. The system performing the authentication may be configured to retrieve values of pNPR 1522 and pDKI 1524 for a contactless card at the time of authentication.

In some examples, to increase the security of the solution, a session key may be derived (such as a unique key per session) but rather than using the master key, the unique card-derived keys and the counter may be used as diversification data, as explained above. For example, each time the card is used in operation, a different key may be used for creating the message authentication code (MAC) and for performing the encryption. Regarding session key generation, the keys used to generate the cryptogram and encipher the data in the one or more applets may comprise session keys based on the card unique keys (Card-Key-Auth 1508 and Card-Key-Dek 1520). The session keys (Aut-Session-Key 1532 and DEK-Session-Key 1510) may be generated by the one or more applets and derived by using the application transaction counter (pATC) 1504 with one or more algorithms. To fit data into the one or more algorithms, only the 2 low order bytes of the 4-byte pATC 1504 is used. In some examples, the four byte session key derivation method may comprise: F1:=PATC (lower 2 bytes) ||'F0'||'00'||PATC (four bytes) F1:=PATC(lower 2 bytes) ||'0F'||'00'||PATC (four bytes) SK:={(ALG (MK) [F1])||ALG (MK)[F2]}, where ALG may include 3DES ECB and MK may include the card unique derived master key.

As described herein, one or more MAC session keys may be derived using the lower two bytes of pATC 1504 counter. At each tap of the contactless card, pATC 1504 is configured to be updated, and the card master keys Card-Key-AUTH 508 and Card-Key-DEK 1520 are further diversified into the session keys Aut-Session-Key 1532 and DEK-Session-KEY 1510. pATC 1504 may be initialized to zero at personalization or applet initialization time. In some examples, the pATC counter 1504 may be initialized at or before personalization, and may be configured to increment by one at each NDEF read.

Further, the update for each card may be unique, and assigned either by personalization, or algorithmically assigned by pUID or other identifying information. For example, odd numbered cards may increment or decrement by 2 and even numbered cards may increment or decrement by 5. In some examples, the update may also vary in sequential reads, such that one card may increment in sequence by 1, 3, 5, 2, 2, ... repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In some examples, only the authentication data and an 8-byte random number followed by MAC of the authentication data may be included. In some examples, the random number may precede cryptogram A and may be one block long. In other examples, there may be no restriction on the length of the random number. In further examples, the total data (i.e., the random number plus the cryptogram) may be a multiple of the block size. In these examples, an additional 8-byte block may be added to match the block produced by the MAC algorithm. As another example, if the algorithms employed used 16-byte blocks, even multiples of that size may be used, or the output may be automatically, or manually, padded to a multiple of that size.

The MAC may be performed by a function key (AUT-Session-Key) 1532. The data specified in cryptogram may be processed with javacard.signature method: ALG_DES_MAC8_ISO9797_1_M2_ALG3 to correlate to EMV ARQC verification methods. The key used for this computation may comprise a session key AUT-Session-Key 1532, as explained above. As explained above, the low order two bytes of the counter may be used to diversify for the one or more MAC session keys. As explained below, AUT-Session-Key 1532 may be used to MAC data 1506, and the resulting data or cryptogram A 1514 and random number RND may be encrypted using DEK-Session-Key 1510 to create cryptogram B or output 1518 sent in the message.

In some examples, one or more HSM commands may be processed for decrypting such that the final 16 (binary, 32 hex) bytes may comprise a 3DES symmetric encrypting using CBC mode with a zero IV of the random number followed by MAC authentication data. The key used for this encryption may comprise a session key DEK-Session-Key 1510 derived from the Card-Key-DEK 1520. In this case, the ATC value for the session key derivation is the least significant byte of the counter pATC 1504.

The format below represents a binary version example embodiment. Further, in some examples, the first byte may be set to ASCII 'A'.

Message Format

| 1 | 2 | 4 | 8 | 8 |
|---|---|---|---|---|
| 0x43 (Message Type 'A') | Version | pATC | RND | Cryptogram A (MAC) |
| Cryptogram A (MAC) | 8 bytes | | | |
| Mac of | | | | |
| 2 | 8 | 4 | 4 | 18 bytes input data |
| Version | pUID | pATC | Shared Secret | |

Message Format

| 1 | 2 | 4 | 16 | |
|---|---|---|---|---|
| 0x43 (Message Type 'A') | Version | pATC | Cryptogram B | |
| Cryptogram A (MAC) | 8 bytes | | | |
| MAC of | | | | |
| 2 | 8 | 4 | 4 | 18 bytes input data |
| Version | pUID | pATC | Shared Secret | |
| Cryptogram B | 16 | | | |
| Sym Encryption of | | | | |
| 8 | 8 | | | |
| RND | Cryptogram A | | | |

Another exemplary format is shown below. In this example, the tag may be encoded in hexadecimal format.

| Message Format | | | | | |
|---|---|---|---|---|---|
| 2 | 8 | 4 | | 8 | 8 |
| Version | pUID | pATC | | RND | Cryptogram A (MAC) |
| 8 bytes | | | | | |
| 8 | 8 | 4 | 4 | 18 bytes input data | |
| pUID | pUID | pATC | Shared Secret | | |

| Message Format | | | | | |
|---|---|---|---|---|---|
| 2 | 8 | 4 | | 16 | |
| Version | pUID | pATC | | Cryptogram B | |
| 8 bytes | | | | | |
| 8 | | 4 | 4 | 18 bytes input data | |
| pUID | pUID | pATC | Shared Secret | | |
| Cryptogram B | 16 | | | | |
| Sym Encryption of | | | | | |
| 8 | 8 | | | | |
| RND | Cryptogram A | | | | |

The UID field of the received message may be extracted to derive, from master keys Iss-Key-AUTH 502 and Iss-Key-DEK 1526, the card master keys (Card-Key-Auth 1508 and Card-Key-DEK 1520) for that particular card. Using the card master keys (Card-Key-Auth 508 and Card-Key-DEK 1520), the counter (pATC) field of the received message may be used to derive the session keys (Aut-Session-Key 1532 and DEK-Session-Key 1510) for that particular card. Cryptogram B 1518 may be decrypted using the DEK-Session-KEY, which yields cryptogram A 1514 and RND, and RND may be discarded. The UID field may be used to look up the shared secret of the contactless card which, along with the Ver, UID, and pATC fields of the message, may be processed through the cryptographic MAC using the re-created Aut-Session-Key to create a MAC output, such as MAC'. If MAC' is the same as cryptogram A 1514, then this indicates that the message decryption and MAC checking have all passed. Then the pATC may be read to determine if it is valid.

During an authentication session, one or more cryptograms may be generated by the one or more applications. For example, the one or more cryptograms may be generated as a 3DES MAC using ISO 9797-1 Algorithm 3 with Method 2 padding via one or more session keys, such as Aut-Session-Key 1532. The input data 1506 may take the following form: Version (2), pUID (8), pATC (4), Shared Secret (4). In some examples, the numbers in the brackets may comprise length in bytes. In some examples, the shared secret may be generated by one or more random number generators which may be configured to ensure, through one or more secure processes, that the random number is unpredictable. In some examples, the shared secret may comprise a random 4-byte binary number injected into the card at personalization time that is known by the authentication service. During an authentication session, the shared secret may not be provided from the one or more applets to the mobile application. Method 2 padding may include adding a mandatory 0x'80' byte to the end of input data and 0x'00' bytes that may be added to the end of the resulting data up to the 8-byte boundary. The resulting cryptogram may comprise 8 bytes in length.

In some examples, one benefit of encrypting an unshared random number as the first block with the MAC cryptogram, is that it acts as an initialization vector while using CBC (Block chaining) mode of the symmetric encryption algorithm. This allows the "scrambling" from block to block without having to pre-establish either a fixed or dynamic IV.

By including the application transaction counter (pATC) as part of the data included in the MAC cryptogram, the authentication service may be configured to determine if the value conveyed in the clear data has been tampered with. Moreover, by including the version in the one or more cryptograms, it is difficult for an attacker to purposefully misrepresent the application version in an attempt to downgrade the strength of the cryptographic solution. In some examples, the pATC may start at zero and be updated by 1 each time the one or more applications generates authentication data. The authentication service may be configured to track the pATCs used during authentication sessions. In some examples, when the authentication data uses a pATC equal to or lower than the previous value received by the authentication service, this may be interpreted as an attempt to replay an old message, and the authenticated may be rejected. In some examples, where the pATC is greater than the previous value received, this may be evaluated to determine if it is within an acceptable range or threshold, and if it exceeds or is outside the range or threshold, verification may be deemed to have failed or be unreliable. In the MAC operation 1512, data 1506 is processed through the MAC using Aut-Session-Key 1532 to produce MAC output (cryptogram A) 1514, which is encrypted.

In order to provide additional protection against brute force attacks exposing the keys on the card, it is desirable that the MAC cryptogram 1514 be enciphered. In some examples, data or cryptogram A 1514 to be included in the ciphertext may comprise: Random number (8), cryptogram (8). In some examples, the numbers in the brackets may comprise length in bytes. In some examples, the random number may be generated by one or more random number generators which may be configured to ensure, through one or more secure processes, that the random number is unpredictable. The key used to encipher this data may comprise a session key. For example, the session key may comprise DEK-Session-Key 1510. In the encryption operation 1516, data or cryptogram A 1514 and RND are processed using DEK-Session-Key 1510 to produce encrypted data, cryptogram B 1518. The data 1514 may be enciphered using 3DES in cipher block chaining mode to ensure that an attacker must run any attacks over all of the ciphertext. As a non-limiting example, other algorithms, such as Advanced Encryption Standard (AES), may be used. In some examples, an initialization vector of 0x'0000000000000000' may be used. Any attacker seeking to brute force the key used for enciphering this data will be unable to determine when the correct key has been used, as correctly decrypted data will be indistinguishable from incorrectly decrypted data due to its random appearance.

In order for the authentication service to validate the one or more cryptograms provided by the one or more applets, the following data must be conveyed from the one or more applets to the mobile device in the clear during an authentication session: version number to determine the cryptographic approach used and message format for validation of the cryptogram, which enables the approach to change in the future; pUID to retrieve cryptographic assets, and derive the card keys; and pATC to derive the session key used for the cryptogram.

FIG. 16 illustrates a method 1600 for generating a cryptogram. For example, At 1602, a network profile record ID (pNPR) and derivation key index (pDKI) may be used to identify which Issuer Master Keys to use in the cryptographic processes for authentication. In some examples, the method may include performing the authentication to retrieve values of pNPR and pDKI for a contactless card at the time of authentication.

At 1604, Issuer Master Keys may be diversified by combining them with the card's unique ID number (pUID) and the PAN sequence number (PSN) of one or more applets, for example, a payment applet.

At 1606, Card-Key-Auth and Card-Key-DEK (unique card keys) may be created by diversifying the Issuer Master Keys to generate session keys which may be used to generate a MAC cryptogram.

At 1608, the keys used to generate the cryptogram and encipher the data in the one or more applets may comprise the session keys of block 1030 based on the card unique keys (Card-Key-Auth and Card-Key-DEK). In some examples, these session keys may be generated by the one or more applets and derived by using pATC, resulting in session keys Aut-Session-Key and DEK-Session-Key.

Figure 17:
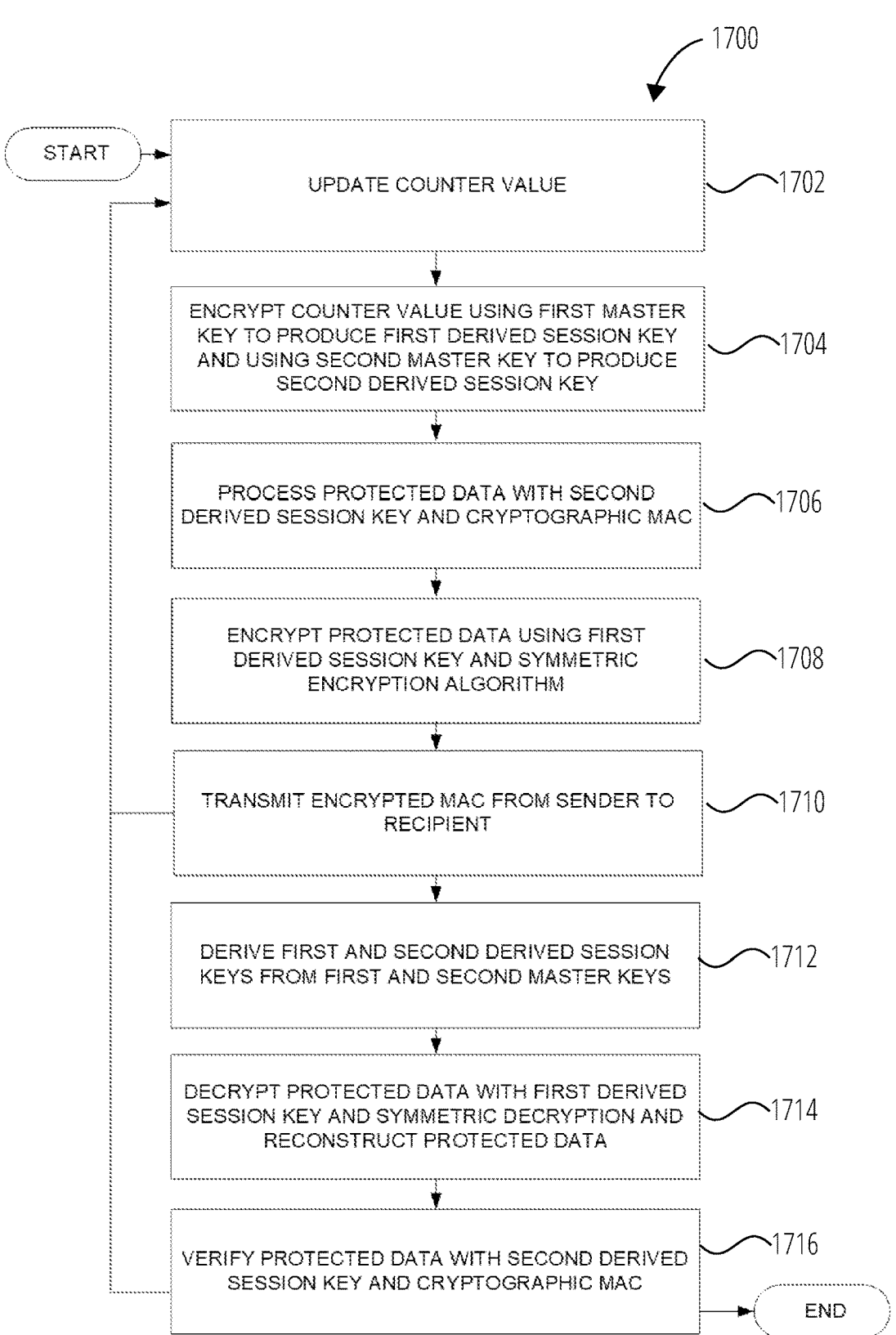
FIG. 17 illustrates an aspect of the subject matter in accordance with one embodiment.

FIG. 17 depicts an exemplary process 1700 illustrating key diversification according to one example. Initially, a sender and the recipient may be provisioned with two different master keys. For example, a first master key may comprise the data encryption master key, and a second master key may comprise the data integrity master key. The sender has a counter value, which may be updated at 1702, and other data, such as data to be protected, which it may secure share with the recipient.

At 1704, the counter value may be encrypted by the sender using the data encryption master key to produce the data encryption derived session key, and the counter value may also be encrypted by the sender using the data integrity master key to produce the data integrity derived session key. In some examples, a whole counter value or a portion of the counter value may be used during both encryptions.

In some examples, the counter value may not be encrypted. In these examples, the counter may be transmitted between the sender and the recipient in the clear, i.e., without encryption.

At 1706, the data to be protected is processed with a cryptographic MAC operation by the sender using the data integrity session key and a cryptographic MAC algorithm. The protected data, including plaintext and shared secret, may be used to produce a MAC using one of the session keys (AUT-Session-Key).

At 1708, the data to be protected may be encrypted by the sender using the data encryption derived session key in conjunction with a symmetric encryption algorithm. In some examples, the MAC is combined with an equal amount of random data, for example each 8 bytes long, and then encrypted using the second session key (DEK-Session-Key).

At 1710, the encrypted MAC is transmitted, from the sender to the recipient, with sufficient information to identify additional secret information (such as shared secret, master keys, etc.), for verification of the cryptogram.

At 1712, the recipient uses the received counter value to independently derive the two derived session keys from the two master keys as explained above.

At 1714, the data encryption derived session key is used in conjunction with the symmetric decryption operation to decrypt the protected data. Additional processing on the exchanged data will then occur. In some examples, after the MAC is extracted, it is desirable to reproduce and match the MAC. For example, when verifying the cryptogram, it may be decrypted using appropriately generated session keys. The protected data may be reconstructed for verification. A MAC operation may be performed using an appropriately generated session key to determine if it matches the decrypted MAC. As the MAC operation is an irreversible process, the only way to verify is to attempt to recreate it from source data.

At 1716, the data integrity derived session key is used in conjunction with the cryptographic MAC operation to verify that the protected data has not been modified.

Some examples of the methods described herein may advantageously confirm when a successful authentication is determined when the following conditions are met. First, the ability to verify the MAC shows that the derived session key was proper. The MAC may only be correct if the decryption was successful and yielded the proper MAC value. The successful decryption may show that the correctly derived encryption key was used to decrypt the encrypted MAC. Since the derived session keys are created using the master keys known only to the sender (e.g., the transmitting device) and recipient (e.g., the receiving device), it may be trusted that the contactless card which originally created the MAC and encrypted the MAC is indeed authentic. Moreover, the counter value used to derive the first and second session keys may be shown to be valid and may be used to perform authentication operations.

Thereafter, the two derived session keys may be discarded, and the next iteration of data exchange will update the counter value (returning to block 1702) and a new set of session keys may be created (at 1710). In some examples, the combined random data may be discarded.

Figure 18:
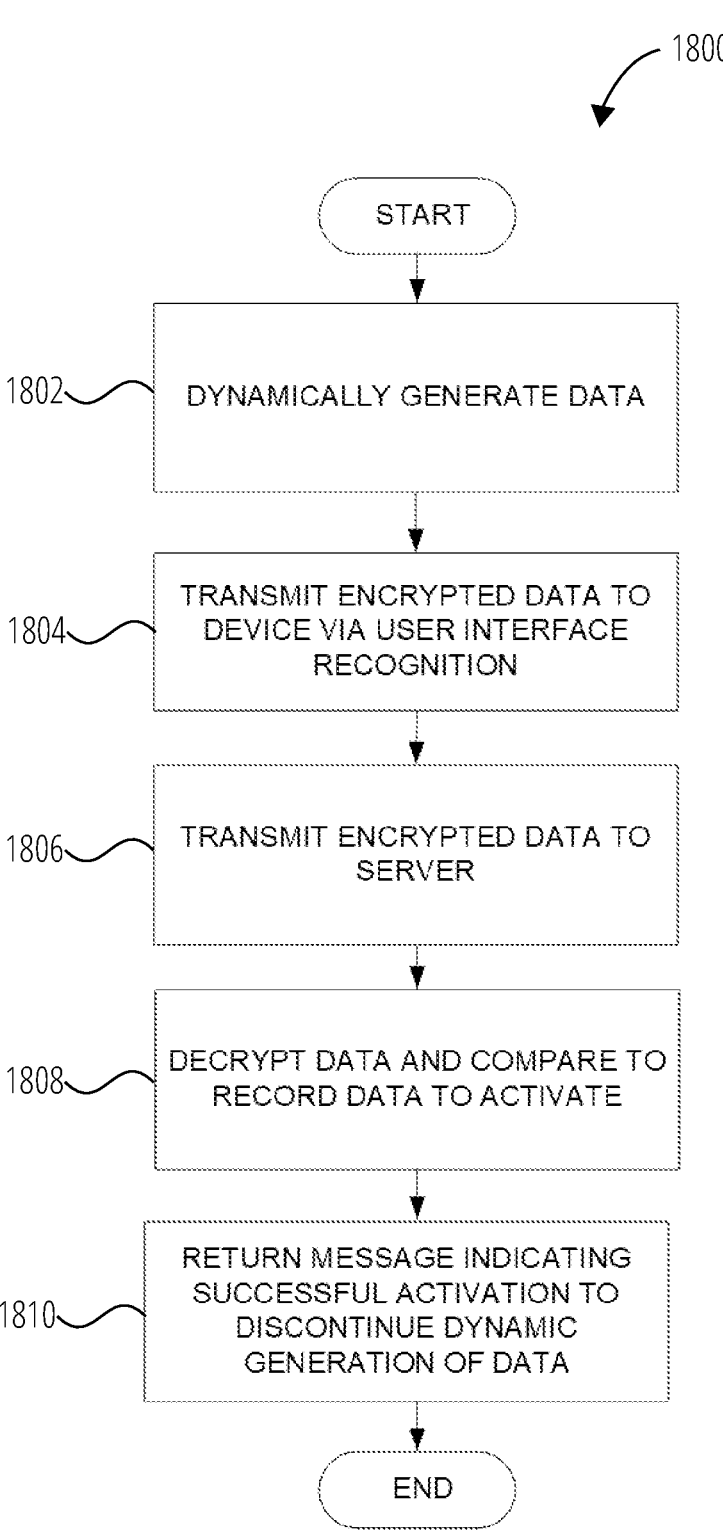
FIG. 18 illustrates an aspect of the subject matter in accordance with one embodiment.

FIG. 18 illustrates a method 1800 for card activation according to an example embodiment. For example, card activation may be completed by a system including a card, a device, and one or more servers. The contactless card, device, and one or more servers may reference same or similar components that were previously explained above such as contactless card 902, client device 904, and a server.

At 1802, the card may be configured to dynamically generate data. In some examples, this data may include information such as an account number, card identifier, card verification value, or phone number, which may be transmitted from the card to the device. In some examples, one or more portions of the data may be encrypted via the systems and methods disclosed herein.

At 1804, one or more portions of the dynamically generated data may be communicated to an application of the device via NFC or other wireless communication. For example, a tap of the card proximate to the device may allow the application of the device to read the one or more portions of the data associated with the contactless card. In some examples, if the device does not comprise an application to assist in activation of the card, the tap of the card may direct the device or prompt the customer to a software application store to download an associated application to activate the card. In some examples, the user may be prompted to sufficiently gesture, place, or orient the card towards a surface of the device, such as either at an angle or flatly placed on, near, or proximate the surface of the device. Responsive to a sufficient gesture, placement and/or orientation of the card, the device may proceed to transmit the one or more encrypted portions of data received from the card to the one or more servers.

At 1806, the one or more portions of the data may be communicated to one or more servers, such as a card issuer server. For example, one or more encrypted portions of the data may be transmitted from the device to the card issuer server for activation of the card.

At 1808, the one or more servers may decrypt the one or more encrypted portions of the data via the systems and methods disclosed herein. For example, the one or more servers may receive the encrypted data from the device and may decrypt it in order to compare the received data to record data accessible to the one or more servers. If a resulting comparison of the one or more decrypted portions of the data by the one or more servers yields a successful match, the card may be activated. If the resulting comparison of the one or more decrypted portions of the data by the one or more servers yields an unsuccessful match, one or more processes may take place. For example, responsive to the determination of the unsuccessful match, the user may be prompted to tap, swipe, or wave gesture the card again. In this case, there may be a predetermined threshold comprising a number of attempts that the user is permitted to activate the card. Alternatively, the user may receive a notification, such as a message on his or her device indicative of the unsuccessful attempt of card verification and to call, email or text an associated service for assistance to activate the card, or another notification, such as a phone call on his or her device indicative of the unsuccessful attempt of card verification and to call, email or text an associated service for assistance to activate the card, or another notification, such as an email indicative of the unsuccessful attempt of card verification and to call, email or text an associated service for assistance to activate the card.

At 1810, the one or more servers may transmit a return message based on the successful activation of the card. For example, the device may be configured to receive output from the one or more servers indicative of a successful activation of the card by the one or more servers. The device may be configured to display a message indicating successful activation of the card. Once the card has been activated, the card may be configured to discontinue dynamically generating data so as to avoid fraudulent use. In this manner, the card may not be activated thereafter, and the one or more servers are notified that the card has already been activated.

The various elements of the devices as previously described with reference to FIGS. 1-18 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores", may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writable or rewritable media, digital or analog media, hard disk, floppy disk, Compact Disk Read Only Memory (CD-ROM), Compact Disk Recordable (CD-R), Compact Disk Rewritable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or micro-processors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed:

1. A computer implemented method, comprising:

triggering, using at least one processor, generation of a validity token based on a received contactless card identifier associated with a contactless card, the validity token is generated upon validating the contactless card using the contactless card identifier, and transmitted to a first computing device communicatively coupled with the at least one processor;

identifying, using the at least one processor, a second computing device in a plurality of second computing devices based on an information request received from the first computing device, the information request including a first public key associated with the first computing device and the validity token, and being associated with the contactless card, wherein the identifying includes identifying the second computing device using information stored in at least one field of the validity token;

sending, using the at least one processor, an encrypted response to the information request and a second public key associated with the identified second computing device to the first computing device, the encrypted response being generated by the identified second computing device and encrypted using a shared key generated using the first public key associated with the first computing device, wherein generation of the encrypted response is based on comparing information identifying the first computing device stored in at least another field of the validity token and the first public key; validating the first computing device upon determining a match between the information identifying the first computing device stored in the at least another field of the validity token and the first public key; and causing, using the at least one processor, based on the sending, the first computing device to decrypt the encrypted response to the information request upon generation of the shared key using the second public key associated with the identified second computing device.

2. The method according to claim 1, wherein the sending the encrypted response to the identified second computing device includes sending the encrypted response to the identified second computing device without decrypting the encrypted response.

3. The method according to claim 1, wherein the contactless card identifier is received from a mobile device communicatively coupled to the at least one processor.

4. The method according to claim 3, wherein the contactless card identifier is received in response to the executing a near-field communication (NFC) exchange between the contactless card and the mobile device upon the contactless card being detected by the mobile device to be located within a predetermined distance of the mobile device.

5. The method according to claim 4, wherein the contactless card identifier includes a contactless card number.

6. The method according to claim 1, wherein the identifying includes extracting, using the at least one processor, the information stored in the at least one field of the validity token included in the information request.

7. The method according to claim 1, wherein generation of the encrypted response includes validation of the first public key associated with the first computing device.

8. The method according to claim 7, wherein the encrypted response is generated upon validation of the information identifying the first computing device stored in the at least another field of the validity token and validation of the first public key associated with the first computing device.

9. The method according to claim 1, wherein the shared key is generated using an elliptic-curve Diffie-Hellman key agreement protocol.

10. The method according to claim 1, wherein the causing includes validation of the second public key associated with the second computing device.

11. The method according to claim 10, wherein the causing includes a comparison of information identifying the second computing device stored in at least one field of the validity token and the second public key, wherein the second computing device is validated upon the information identifying the second computing device stored in the at least one field of the validity token matching the second public key.

12. The method according to claim 11, wherein the encrypted response is decrypted, using the shared key, upon validation of the information identifying the second computing device stored in the at least one field of the validity token and validation of the second public key associated with the second computing device.

13. The method according to claim 1, wherein at least one of the first and second computing devices are associated with an issuer of the contactless card.

14. The method according to claim 1, wherein the contactless card includes at least one of the following: a credit card, a debit card, an electronic gift card, a pre-paid credit card, a pre-paid debit card, and any combination thereof.

15. A system, comprising: at least one processor; and at least one non-transitory storage media storing instructions, that when executed by the at least one processor, cause the at least one processor to perform operations including receiving a validity token generated using a contactless card identifier associated with a contactless card; transmitting the validity token to a first computing device;

identifying a second computing device in a plurality of second computing devices based on an information request received from the first computing device, the information request including a first public key associated with the first computing device and the validity token, and being associated with the contactless card, the identified second computing device generating an encrypted response to the information request, wherein the identifying includes identifying the second computing device using information stored in at least one field of the validity token, wherein generation of the encrypted response is based on comparing information identifying the first computing device stored in at least another field of the validity token and the first public key; validating the first computing device upon determining a match between the information identifying the first computing device stored in the at least another field of the validity token and the first public key; and causing the first computing device to decrypt the encrypted response to the information request upon generation of a shared key using a second public key associated with the identified second computing device.

16. The system according to claim 15, wherein the validity token is generated upon validating the contactless card using the contactless card identifier.

17. The system according to claim 15, wherein the operations further comprise sending the encrypted response to the information request and the second public key associated with the identified second computing device to the first computing device, the encrypted response being generated by the identified second computing device and encrypted using the shared key generated using the first public key associated with the first computing device.

18. The system according to claim 15, wherein the identifying includes extracting information stored in at least one field of the validity token included in the information request.

19. A computer program product comprising a non-transitory machine-readable medium storing instructions that, when executed by at least one programmable processor, cause the at least one programmable processor to perform operations comprising:

receiving, from a mobile device, a contactless card identifier associated with a contactless card based on execution of a near-field communication (NFC) exchange between the contactless card and the mobile device upon the contactless card being detected by the mobile device to be located within a predetermined distance of the mobile device;

transmitting, to a first computing device, a validity token generated based on the received contactless card identifier, the validity token being generated upon validating the contactless card using the contactless card identifier;

identifying a second computing device in a plurality of second computing devices based on an information request received from the first computing device, the information request including a first public key associated with the first computing device and the validity token, and being associated with the contactless card, wherein the identifying includes identifying the second computing device using information stored in at least one field of the validity token;

sending an encrypted response to the information request and a second public key associated with the identified second computing device to the first computing device, the encrypted response being generated by the identified second computing device and encrypted using a shared key generated using the first public key associated with the first computing device, the sending of the encrypted response to the identified second computing device includes sending the encrypted response to the identified second computing device without decrypting the encrypted response, wherein generation of the encrypted response is based on comparing information identifying the first computing device stored in at least another field of the validity token and the first public key; validating the first computing device upon determining a match between the information identifying the first computing device stored in the at least another field of the validity token and the first public key; and causing the first computing device to decrypt the encrypted response to the information request upon generation of the shared key using the second public key associated with the identified second computing device.

* * * * *